(12) United States Patent
Gidge et al.

(10) Patent No.: US 7,321,291 B2
(45) Date of Patent: Jan. 22, 2008

(54) POWER LINE COMMUNICATIONS SYSTEM AND METHOD OF OPERATING THE SAME

(75) Inventors: Brett D. Gidge, Mount Airy, MD (US); William O. Radtke, Ellicott City, MD (US)

(73) Assignee: Current Technologies, LLC, Germantown, MD (US)

( * ) Notice: Subject to any disclaimer, the term of this patent is extended or adjusted under 35 U.S.C. 154(b) by 210 days.

(21) Appl. No.: 10/973,493

(22) Filed: Oct. 26, 2004

(65) Prior Publication Data
US 2006/0097573 A1    May 11, 2006

(51) Int. Cl.
*H04M 11/04*    (2006.01)

(52) U.S. Cl. ............ 340/310.01; 340/310.06; 340/310.07; 340/310.08; 340/531; 340/539.1

(58) Field of Classification Search ........... 340/310.01, 340/310.02, 310.06, 310.07, 310.08, 310.11, 340/531, 539.1; 375/220, 222, 257, 259
See application file for complete search history.

(56) References Cited

U.S. PATENT DOCUMENTS

| | | | |
|---|---|---|---|
| 2,577,731 A | 12/1951 | Berger | |
| 3,656,112 A | 4/1972 | Paull | |
| 3,810,096 A | 5/1974 | Kabat et al. | |
| 3,911,415 A | 10/1975 | Whyte | |
| 3,942,168 A | 3/1976 | Whyte | |
| 3,942,170 A | 3/1976 | Whyte | |
| 3,944,723 A | 3/1976 | Fong | |
| 3,967,264 A | 6/1976 | Whyte et al. | |
| 3,973,087 A | 8/1976 | Fong | |
| 3,973,240 A | 8/1976 | Fong | |
| 4,004,110 A | 1/1977 | Whyte | |
| 4,012,733 A | 3/1977 | Whyte | |
| 4,057,793 A | 11/1977 | Johnson et al. | |
| 4,060,735 A | 11/1977 | Pascucci et al. | |

(Continued)

FOREIGN PATENT DOCUMENTS

DE      197 28 270 A1    1/1999

(Continued)

OTHER PUBLICATIONS

"EMETCON Automated Distribution System: Communications Guide", *Westinghouse ABB Power T & D Company Technical Manual 42-6001A.*, (Sep. 1989),1-55.

(Continued)

*Primary Examiner*—Hung Nguyen
(74) *Attorney, Agent, or Firm*—Mel Barnes; Capital Legal Group, LLC

(57) ABSTRACT

The present invention provides a system and method for operating a power line communications system for communicating via an underground residential distribution power system. One embodiment of the present invention includes an aggregation point, which may be co-located with a point of presence, communicatively coupled to one or distribution points. The distribution points are communicatively coupled to one or more medium voltage interface devices. The medium voltage interface devices are communicatively coupled to one or more power line bridges via URD medium voltage power lines. The power line bridges may be co-located with a URD distribution transformer and provide communications to the user devices communicatively coupled to the LV power lines of the distribution transformer.

72 Claims, 16 Drawing Sheets

U.S. PATENT DOCUMENTS

| | | | |
|---|---|---|---|
| 4,250,489 A | 2/1981 | Dudash et al. |
| 4,357,598 A | 11/1982 | Melvin, Jr. |
| 4,408,186 A | 10/1983 | Howell |
| 4,433,284 A | 2/1984 | Perkins |
| 4,473,816 A | 9/1984 | Perkins |
| 4,473,817 A | 9/1984 | Perkins |
| 4,475,209 A | 10/1984 | Udren |
| 4,569,045 A | 2/1986 | Schieble et al. |
| 4,599,598 A | 7/1986 | Komoda et al. |
| 4,638,298 A | 1/1987 | Spiro |
| 4,642,607 A | 2/1987 | Strom et al. |
| 4,675,648 A | 6/1987 | Roth et al. |
| 4,686,382 A | 8/1987 | Shuey |
| 5,272,462 A | 12/1993 | Teyssandier et al. |
| 5,559,377 A | 9/1996 | Abraham |
| 5,625,863 A | 4/1997 | Abraham |
| 5,684,450 A | 11/1997 | Brown |
| 5,717,685 A | 2/1998 | Abraham |
| 5,726,980 A | 3/1998 | Rickard |
| 5,777,769 A | 7/1998 | Coutinho |
| 5,818,821 A | 10/1998 | Schurig |
| 5,856,776 A | 1/1999 | Armstrong et al. |
| 5,870,016 A | 2/1999 | Shresthe |
| 5,929,750 A | 7/1999 | Brown |
| 5,933,071 A | 8/1999 | Brown |
| 5,937,342 A | 8/1999 | Kline |
| 5,949,327 A | 9/1999 | Brown |
| 5,952,914 A | 9/1999 | Wynn |
| 5,978,371 A | 11/1999 | Mason, Jr. et al. |
| 5,994,998 A | 11/1999 | Fisher et al. |
| 6,014,386 A | 1/2000 | Abraham |
| 6,040,759 A | 3/2000 | Sanderson |
| 6,144,292 A | 11/2000 | Brown |
| 6,157,292 A | 12/2000 | Piercy et al. |
| 6,172,597 B1 | 1/2001 | Brown |
| 6,275,144 B1 | 8/2001 | Rumbaugh |
| 6,282,405 B1 | 8/2001 | Brown |
| 6,300,881 B1 | 10/2001 | Yee et al. |
| 6,331,814 B1 | 12/2001 | Albano |
| 6,346,875 B1 * | 2/2002 | Puckette et al. ....... 340/870.02 |
| 6,373,377 B1 | 4/2002 | Sacca et al. |
| 6,396,392 B1 | 5/2002 | Abraham |
| 6,407,987 B1 | 6/2002 | Abraham |
| 6,452,482 B1 | 9/2002 | Cern |
| 6,624,532 B1 | 9/2003 | Davidow |
| 6,646,447 B2 | 11/2003 | Cern et al. |
| 6,668,058 B2 | 12/2003 | Grimes |
| 6,687,574 B2 | 2/2004 | Pietrowicz et al. |
| 6,844,809 B2 | 1/2005 | Manis et al. |
| 6,882,634 B2 * | 4/2005 | Bagchi et al. ............. 370/338 |
| 6,885,674 B2 | 4/2005 | Hunt et al. |
| 6,922,135 B2 | 7/2005 | Abraham |
| 6,933,835 B2 | 8/2005 | Kline |
| 6,950,567 B2 | 9/2005 | Kline |
| 6,958,680 B2 | 10/2005 | Kline |
| 6,965,302 B2 | 11/2005 | Mollenkopf et al. |
| 6,965,303 B2 | 11/2005 | Mollenkopf |
| 6,977,578 B2 | 12/2005 | Kline |
| 6,980,090 B2 | 12/2005 | Mollenkopf |
| 6,980,091 B2 | 12/2005 | White et al. |
| 6,985,714 B2 | 1/2006 | Akiyama et al. |
| 6,993,317 B2 | 1/2006 | Belsak, Jr. |
| 6,998,962 B2 | 2/2006 | Cope et al. |
| 7,042,351 B2 | 5/2006 | Kline |
| 7,046,124 B2 * | 5/2006 | Cope et al. ................. 375/258 |
| 7,046,882 B2 | 5/2006 | Kline |
| 7,075,414 B2 | 7/2006 | Giannini et al. |
| 7,098,773 B2 | 8/2006 | Berkman |
| 7,103,240 B2 | 9/2006 | Kline |
| 7,142,094 B1 | 11/2006 | Davidow et al. |
| 7,173,935 B2 | 2/2007 | Lou et al. |
| 7,173,938 B1 | 2/2007 | Davidow |
| 7,194,528 B1 | 3/2007 | Davidow |
| 7,248,158 B2 | 7/2007 | Berkman et al. |
| 2001/0054953 A1 | 12/2001 | Kline |
| 2002/0002040 A1 | 1/2002 | Kline et al. |
| 2002/0027496 A1 | 3/2002 | Cern et al. |
| 2002/0097953 A1 | 7/2002 | Kline |
| 2002/0105413 A1 | 8/2002 | Cern et al. |
| 2002/0109585 A1 | 8/2002 | Sanderson |
| 2002/0110310 A1 | 8/2002 | Kline |
| 2002/0110311 A1 | 8/2002 | Kline |
| 2002/0118101 A1 | 8/2002 | Kline |
| 2002/0121963 A1 | 9/2002 | Kline |
| 2002/0154000 A1 | 10/2002 | Kline |
| 2003/0039257 A1 | 2/2003 | Manis |
| 2003/0054793 A1 | 3/2003 | Manis et al. |
| 2003/0160684 A1 | 8/2003 | Cern |
| 2003/0169155 A1 | 9/2003 | Mollenkopf et al. |
| 2003/0224784 A1 | 12/2003 | Hunt et al. |
| 2003/0227373 A1 | 12/2003 | Lou et al. |
| 2004/0056734 A1 | 3/2004 | Davidow |
| 2004/0067745 A1 | 4/2004 | Belsak |
| 2004/0083066 A1 | 4/2004 | Hayes et al. |
| 2004/0090312 A1 | 5/2004 | Manis et al. |
| 2004/0110483 A1 | 6/2004 | Mollenkopf |
| 2004/0113756 A1 | 6/2004 | Mollenkopf |
| 2004/0113757 A1 | 6/2004 | White, II et al. |
| 2004/0135676 A1 | 7/2004 | Berkman et al. |
| 2004/0157551 A1 | 8/2004 | Gainey et al. |
| 2004/0163128 A1 | 8/2004 | Phillips et al. |
| 2004/0168199 A1 | 8/2004 | Phillips et al. |
| 2004/0223617 A1 | 11/2004 | Corcoran et al. |
| 2004/0227621 A1 | 11/2004 | Cope et al. |
| 2004/0227622 A1 | 11/2004 | Giannini et al. |
| 2004/0242185 A1 | 12/2004 | Lee |
| 2005/0040809 A1 | 2/2005 | Uber, III et al. |
| 2005/0046550 A1 | 3/2005 | Crenshaw et al. |
| 2005/0068223 A1 | 3/2005 | Vavik |
| 2005/0111533 A1 | 5/2005 | Berkman |
| 2005/0128057 A1 | 6/2005 | Mansfield et al. |
| 2005/0168326 A1 | 8/2005 | White et al. |
| 2005/0200459 A1 | 9/2005 | White, II |
| 2005/0220004 A1 | 10/2005 | Vollmer et al. |
| 2005/0285720 A1 | 12/2005 | Cope et al. |
| 2006/0044076 A1 | 3/2006 | Law |
| 2006/0045105 A1 | 3/2006 | Dobosz et al. |
| 2006/0049693 A1 | 3/2006 | Abraham et al. |
| 2006/0073805 A1 | 4/2006 | Zumkeller et al. |
| 2006/0079198 A1 | 4/2006 | Sanderson |
| 2006/0082219 A1 | 4/2006 | Gerszberg et al. |
| 2006/0097573 A1 | 5/2006 | Gidge et al. |
| 2006/0146866 A1 | 7/2006 | Horvath et al. |
| 2006/0291575 A1 | 12/2006 | Berkman et al. |
| 2007/0076505 A1 | 4/2007 | Radtke et al. |

FOREIGN PATENT DOCUMENTS

| | | |
|---|---|---|
| DE | 100 61 584 A1 | 6/2002 |
| EP | 0 470 185 B1 | 11/1995 |
| EP | 0 913 955 A2 | 5/1999 |
| EP | 1 217 760 A1 | 6/2002 |
| EP | 1 251 646 A2 | 10/2002 |
| GB | 2 293 950 A | 4/1996 |
| JP | 1276933 | 11/1989 |
| JP | 10200544 | 7/1998 |
| WO | WO-01/08321 A1 | 2/2001 |
| WO | WO-03/030396 A2 | 4/2003 |
| WO | WO-03/039022 A1 | 5/2003 |

WO WO-2004/008656 A1 1/2004

OTHER PUBLICATIONS

"IEEE Guide for Power-Line Carrier Applications, ANSI/IEEE Std 643-1980", *The Institute of Electrical and Electronics Engineers, Inc.*, (1980),1-80.

"Outlook Conference 2004: Amperion Deployment Overview", *Primen Conference*, (May 7, 2004),1-10.

"PLC, A New Competitor in Broadband Internet Access", *Power Line Communications Conference*, (Dec. 12, 2001),1-60.

"Power Line Communications", *Power Line Communications*, www.plexeon.com/power.html, (1998),1-2.

"White Paper on Medium Voltage Powerline Communication (PLC) Networks", *CIGRE SC D2 WG 14, Broadband PLC*, (Mar. 2005),1-58.

Barstow, J M., "A Carrier Telephone System for Rural Service", *AIEE Transactions*, (1947),301-307.

Dostert, K, "EMC Aspects of High Speed Powerline Communications", *Proceedings of the 15th International Wroclaw Symposium and Exhibition on Electromagnetic Capability*, (Jun. 27-30, 2000),98-102.

Dostert, K, "Powerline Communications, Ch. 5", *Powerline Communications*, (2001),286, 288-292.

Feduschak, N A., "Waiting in the Wings: Is Powerline Technology Ready to Compete with Cable?", www.cabletoday.com/ic2/archives/0301/0301powerline.htm, (Mar. 2001),1-5.

Jee, G, et al., "Demonstration of the Technical Viability of PLC Systems on Medium- and Low-Voltage Lines in the United States", *IEEE Communication Magazine*, (May 2003),108-112.

U.S. Appl. No. 11/608,550, filed Dec. 8, 2006.

* cited by examiner

POWER LINE COMMUNICATIONS SYSTEM AND METHOD OF OPERATING THE SAME

FIELD OF THE INVENTION

The present invention generally relates to data communications over a power distribution system and more particularly, to a power line communication system and method of using the same.

BACKGROUND OF THE INVENTION

Well-established power distribution systems exist throughout most of the United States, and other countries, which provide power to customers via power lines. With some modification, the infrastructure of the existing power distribution systems can be used to provide data communication in addition to power delivery, thereby forming a power line communication system (PLCS). In other words, existing power lines, that already have been run to many homes and offices, can be used to carry data signals to and from the homes and offices. These data signals are communicated on and off the power lines at various points in the power line communication system, such as, for example, near homes, offices, Internet service providers, and the like.

While the concept may sound simple, there are many challenges to overcome in order to use power lines for data communication. Power lines are not designed to provide high speed data communications, are susceptible to interference, and are very lossy at the frequencies used for data communications. Additionally, federal regulations limit the amount of radiated energy of a power line communication system, which therefore limits the power of the data signal that can be injected onto power lines.

Power distribution systems include numerous sections, which transmit power at different voltages. The transition from one section to another typically is accomplished with a transformer. The sections of the power distribution system that are connected to the customers premises typically are low voltage (LV) sections having a voltage between 100 volts (Vrms, 60 Hz, or "V"). and 240V, depending on the system. In the United States, the LV section typically is about 120V. The sections of the power distribution system that provide the power to the LV sections are referred to as the medium voltage (MV) sections. The voltage of the MV section is in the range of 1,000V to 100,000V. The transition from the MV section to the LV section of the power distribution system typically is accomplished with a distribution transformer, which converts the higher voltage of the MV section to the lower voltage of the LV section.

Power system transformers are one obstacle to using power distribution lines for data communication. Transformers act as a low-pass filter, passing the low frequency signals (e.g., the 50 or 60 Hz) power signals and impeding the high frequency signals (e.g., frequencies typically used for data communication). As such, power line communication systems face the challenge of communicating the data signals around, or through, the distribution transformers.

Furthermore, up to ten (and sometimes more) customer premises will typically receive power from one distribution transformer via their respective LV power lines. However, all of the customer premises LV power lines typically are electrically connected at the transformer. Consequently, a power line communications system must be able to tolerate the interference produced by many customers. In addition, the power line communication system should provide bus arbitration and router functions for numerous customers who share a LV subnet (i.e., the customer premises LV power lines that are all electrically connected to the LV power line extending from the LV side of the transformer) and a MV power line.

In addition, components of the power line communication system, such as the distribution transformer bypass device (PLB), must electrically isolate the MV power signal from the LV power lines and the customer premises. Furthermore, a communication device of the system should be designed to facilitate bi-directional communication and to be installed without disrupting power to customers. These and other advantages are provided by various embodiments of the present invention.

SUMMARY OF THE INVENTION

The present invention provides a system and method for operating a power line communications system for communicating via an underground residential distribution power system. One embodiment of the present invention includes an aggregation point, which may be co-located with a point of presence, communicatively coupled to one or more distribution points. The distribution points are communicatively coupled to one or more medium voltage interface devices. The medium voltage interface devices are communicatively coupled to one or more power line bridges via URD medium voltage power lines. The power line bridges may be co-located with a URD distribution transformer and provide communications to the user devices communicatively coupled to the LV power lines of the distribution transformer.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description of the present invention.

System Architecture and General Design Concepts

Power distribution systems typically include components for power generation, power transmission, and power delivery. A transmission substation typically is used to increase the voltage from the power generation source to high voltage (HV) levels for long distance transmission on HV transmission lines to a substation. Typical voltages found on HV transmission lines range from 69 kilovolts (kV) to in excess of 800 kV.

Figure 1:
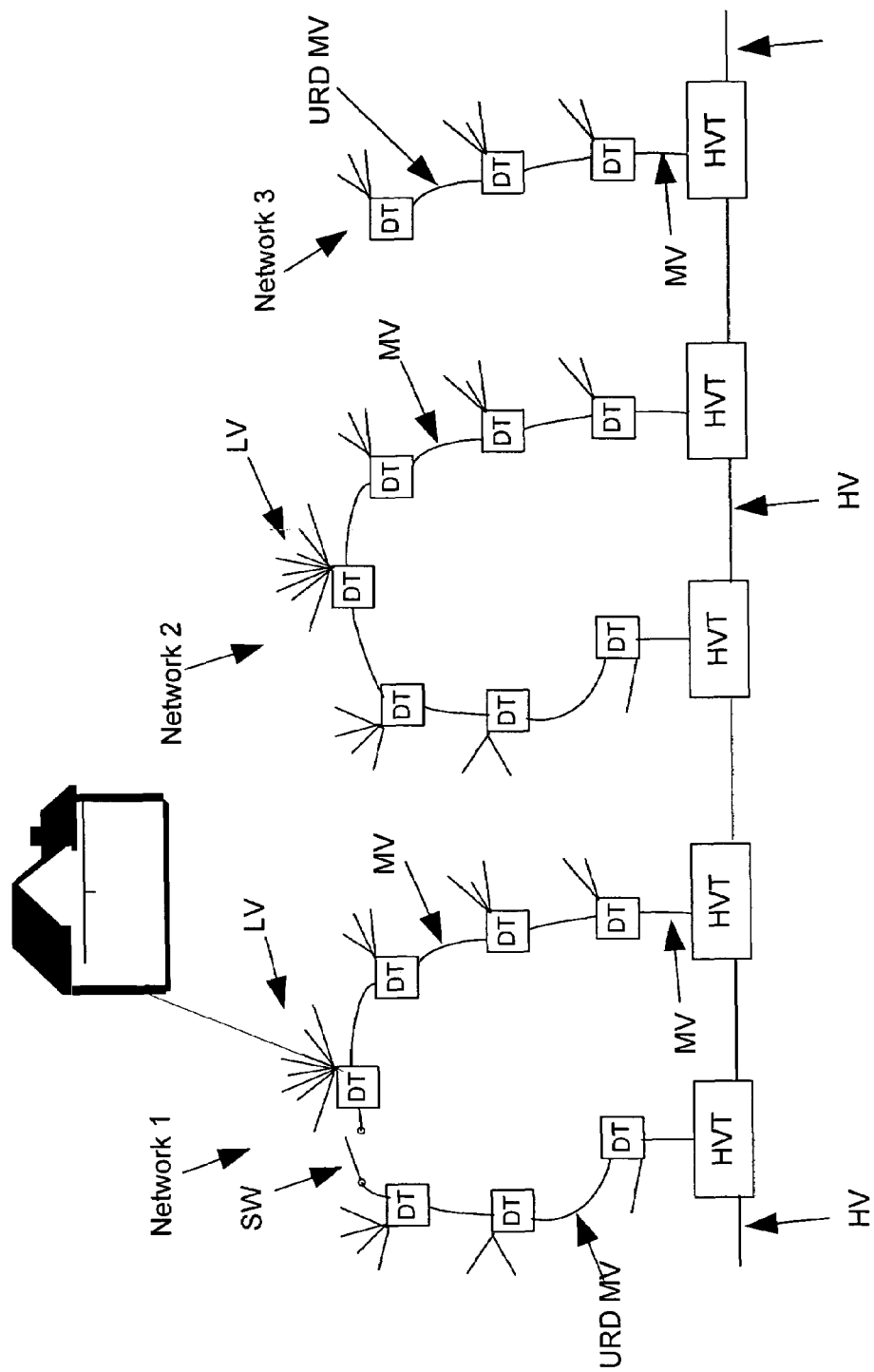
FIG. 1 is a diagram of an exemplary power distribution system with which the present invention may be employed.

As shown in FIG. 1, in addition to HV transmission lines, power distribution systems include MV power lines and LV power lines. As discussed, MV typically ranges from about 1000 V to about 100 kV and LV typically ranges from about 100 V to about 600 V. Transformers are used to convert between the respective voltage portions, e.g., between the HV section and the MV section and between the MV section and the LV section. Transformers have a primary side for connection to a first voltage (e.g., the MV section) and a secondary side for outputting another (usually lower) voltage (e.g., the LV section). Such transformers are often referred to as distribution transformers or a step down transformers, because they "step down" the voltage to some lower voltage. Transformers, therefore, provide voltage conversion for the power distribution system. Thus, power is carried from substation transformer to a distribution transformer over one or more MV power lines. Power is carried from the distribution transformer to the customer premises via one or more LV power lines.

In addition, a distribution transformer (DT) may function to distribute one, two, three, or more phase voltages to the customer premises, depending upon the demands of the user. In the United States, for example, these local distribution transformers typically feed anywhere from one to ten homes, depending upon the concentration of the customer premises in a particular area. Distribution transformers may be pole-top transformers located on a utility pole, pad-mounted transformers located on the ground, or transformers located under ground level.

FIG. 1 discloses a representative underground residential distribution (URD) system comprising a high voltage (HV) power line that is connected to a plurality of high voltage transformers (HVT) that steps down the high voltage to medium voltage.

The HVT steps down the high voltage to medium voltage for distribution on the medium voltage (MV) power lines which are connected to one or more distribution transformers (DTs). Each DT further steps down the medium voltage to low voltage (LV) and typically is connected to one or more LV power lines, each of which may extend to a separate customer premises (not shown in FIG. 1).

The URD network of FIG. 1 includes two types of topographies. The first type is commonly referred to as a ring or "U" topology as represented by networks 1 and 2. The ring network may be U shaped with each leg of the U being connected to a HVT. In addition, the ring network may include a switch SW that connects both sides of the ring together (as in network 1). Consequently, should either HVT fail (or a break in the MV power line occur) the switch may be closed so that the entire MV network receives power. Other such networks may not include a switch (as in network 2).

Another type of topology is referred to as a radial or star network as shown in network 3 in which one or more MV power lines extend away from a single HVT. While the illustrations of these networks depict a single MV power line, a radial or ring network configuration may include multiple MV power lines extending from each HVT (e.g., one or more sets of three cables with each cable of each set carrying one phase of the three phases in a three phase system).

As is known to those skilled in the art, each DT in the URD network may be electrically connected to the adjacent DTs via a length of URD cable. The URD cables typically may be terminated (e.g., on each end) via an elbow that plugs into a bushing on the DT. The two cables typically are electrically connected to each other inside the transformer enclosure and are also connected to the primary of the distribution transformer itself. As discussed, the secondary of the DT is connected to the LV power lines supplying power to the customer premises. Thus, the series of URD cables, and transformers connecting them, form a first (MV) segment of the URD power distribution network and the LV power lines connected to the DTs form a plurality of low voltage segments.

Figure 2:
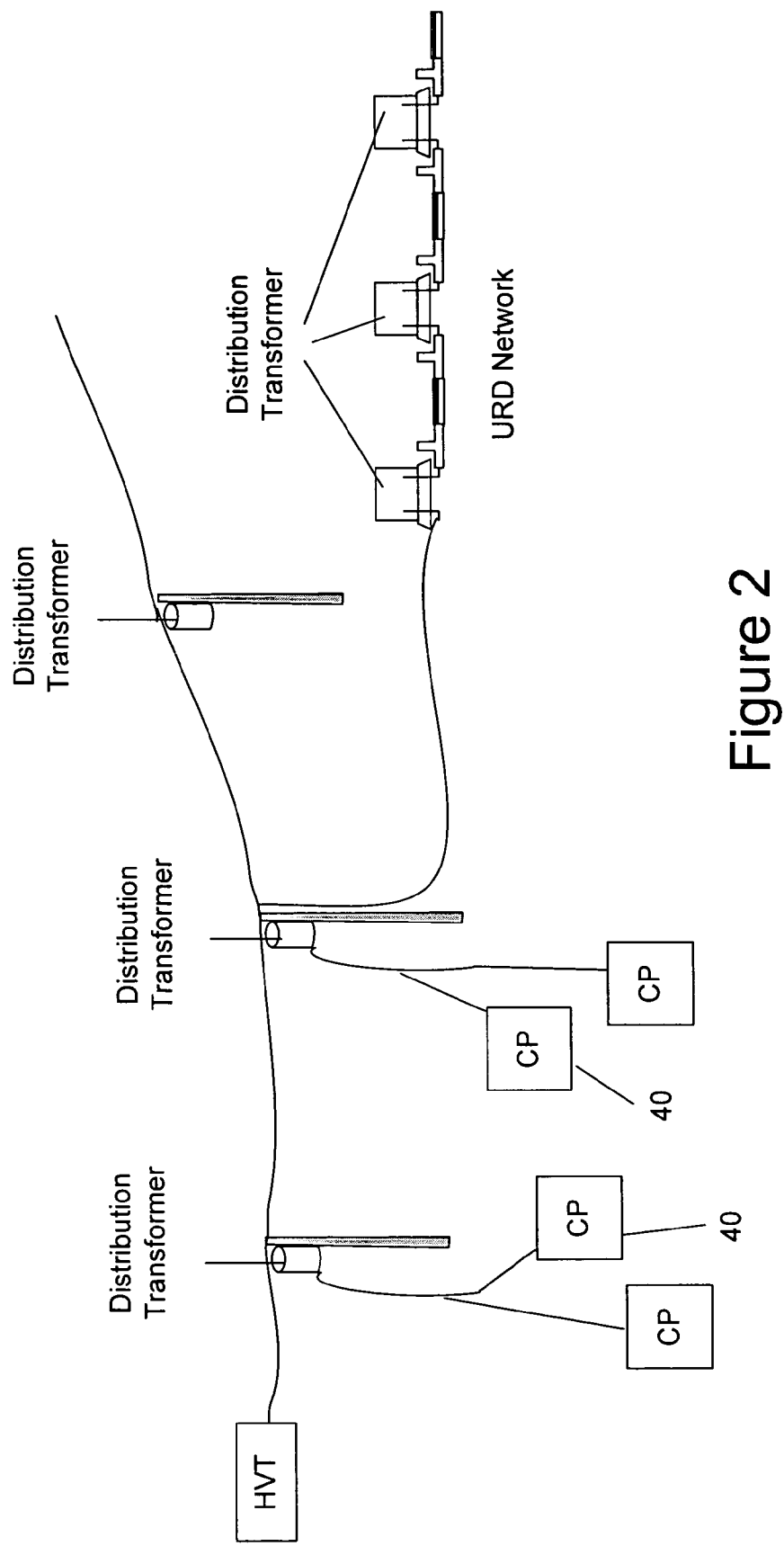
FIG. 2 is a diagram of the exemplary power distribution system of FIG. 1 modified to operate as a power line communication system, in accordance with an embodiment of the present invention.

The URD network may be connected to, and receive power from, an overhead MV power line. Referring to FIG. 2, a URD cable may extend up a utility pole and terminate with a pothead connector (not shown) for connection to an overhead MV power line (known as a Riser-Pole). At the other end, the URD cable may terminate with an elbow to be plugged into a bushing at a transformer. As discussed, the URD cables extending between URD transformers typically will terminate with an elbow to be plugged in the transformer on both ends. Typically, the URD cable will include a center conductor, an insulator surrounding the center conductor, a concentric neutral conductor surrounding the insulator, and an external insulator surrounding the concentric neutral conductor. In addition, the cable may include one or more sheaths such as a semi-conductive sheath around the insulator.

Power Line Communication System

Figure 3:
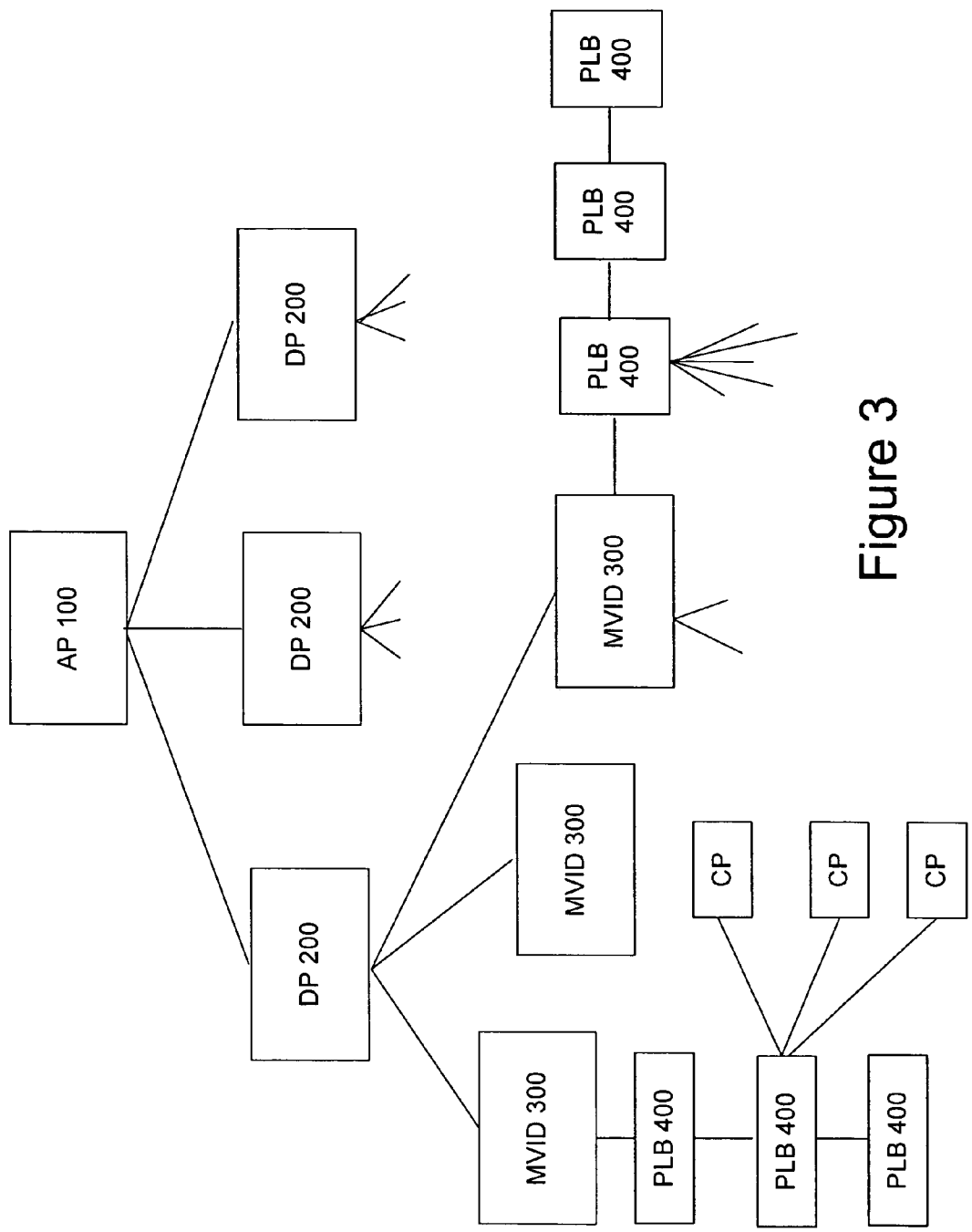
FIG. 3 is a schematic of a power line communication system in accordance with an embodiment of the present invention.

FIG. 3 provides a schematic of one embodiment of the present invention, which includes an aggregation point (AP) that may be co-located with a point of presence (POP) for connection to the Internet and/or other network. The AP 100 may include a conventional Internet Protocol (IP) data packet router and may be directly connected to an Internet backbone thereby providing access to the Internet. Alternatively, the AP 100 may be connected to a core router (not shown), which provides access to the Internet, or other communication network.

The AP 100 may route voice traffic to and from a voice service provider and route Internet traffic to and from an Internet service provider. The routing of packets to the appropriate provider may be determined by any suitable means such as by including information in the data packets to determine whether a packet is voice. If the packet is voice, the packet may be routed to the voice service provider and, if not, the packet may be routed to the Internet service provider. Similarly, the packet may include information (which may be a portion of the address) to determine whether a packet is Internet data. If the packet is Internet data, the packet may be routed to the Internet service provider and, if not, the packet may be routed to the voice service provider.

The AP 100 may be communicatively coupled to one or more distribution points (DPs) 200. Each DP 200 may be communicatively coupled to one or more MV interface devices (MVID) 300. Each MVID 300 may be in communication with one or more power line bridges (PLBs) 400, via the URD medium voltage power line(s). The PLBs 400 may be in communication with one or more user devices that reside in one or more customer premises CP via the low voltage power lines or via a wireless link. As will be evident from the discussion below, communications over the power distribution network occur between the MVID 300 and the customer premises user devices (e.g., via the PLBs). Communications upstream from the MVID 300—such as between the MVIDs 300 and their DPs 200 or between the DPs 200 and the AP 100—may be fiber optic, wireless, coaxial cable, T-carrier, Synchronous Optical Network (SONET), any other suitable medium, or any combination thereof. As will be evident to one skilled in the art, each network element (e.g., MVID 300, DP 200, or AP 100), would include a transceiver appropriate for communicating over the selected medium (e.g., a wireless transceiver for a wireless link).

The PLCS also may include a power line server (PLS) (not shown) that is a computer system with memory for storing a database of information about the PLCS and includes a network element manager (NEM) that monitors and controls the PLCS. The PLS allows network operations personnel to provision users and network equipment, manage customer data, and monitor system status, performance and usage. The PLS may reside at a remote operations center to oversee a group of communication devices via the Internet. The PLS may provide an Internet identity to the network devices by assigning the devices (e.g., user devices, PLBs 400, (e.g., the LV modems and MV modems of PLBs), repeaters, MVIDs 300, DPs 200, and AP 100 if necessary) an IP address and storing the IP address and other device identifying information (e.g., the device's location, address, serial number, etc.) in its memory. In addition, the PLS may approve or deny user device authorization requests, command status reports and measurements from the PLBs, repeaters, and MVIDs, and provide application software upgrades to the communication devices (e.g., PLBs, MVIDs (if necessary), repeaters, and other devices). The PLS, by collecting electric power distribution information and interfacing with utilities' back-end computer systems may provide enhanced distribution services such as automated meter reading, outage detection, load balancing, distribution automation, Volt/Volt-Amp Reactance (Volt/VAr) management, and other similar functions. The PLS also may be connected to one or more APs 100 directly or through the Internet and therefore can communicate with any of the PLBs, repeaters, user devices, and other devices through the respective AP 100.

Figure 4:
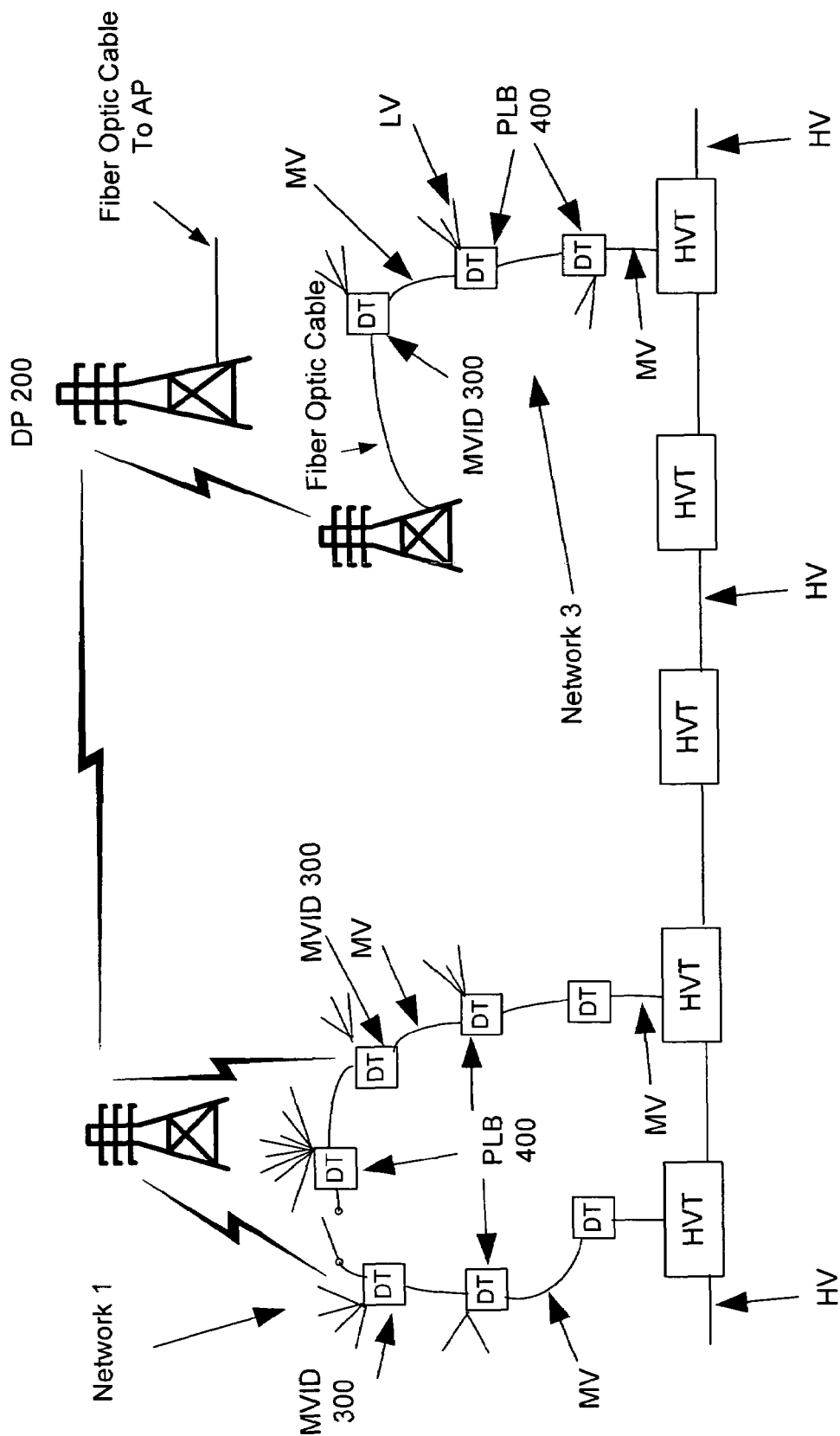
FIG. 4 is a block diagram of an example PLCS, in accordance with an embodiment of the present invention.

FIG. 4 illustrates example underground PLCS subnets that employ an embodiment of the present invention. In FIG. 4 each distribution transformer is indicated by small square box and labeled DT. Referring to network 1, a MVID 300 is installed at two distribution transformers and a PLB 400 is installed at the remaining distribution transformers. For ease of illustration, the PLB 400 and MVIDs 300 in FIG. 4 are not shown separately from the DTs. In network 1, each PLB 400 is in communication with the closest MVID 300 via the MV power line with which it is communicatively coupled and provides communications to the customer premises via the LV power lines. Thus, the PLBs 400 are communicatively coupled to the MV power line and the LV power lines. The PLB 400 may communicate with the MVID 300 directly, or the data from the PLB 400 may be repeated (e.g., demodulated, source decoded, channel decoded, error decoded, decrypted, and then encrypted, error encoded, channel encoded, source encoded and modulated) and/or amplified by one or more of the PLBs 400 between the PLB 400 and the MVID.

The MVIDs 300 may be configured to communicate upstream via a wireless communications link, twisted pair, coaxial cable, other conductor, or via fiber optic link. In this example, the MVIDs 300 of network 1 are in communication with a wireless repeater, which is in wireless communication with DP 200, which is in communication with the AP 100 via a fiber optic link. In other embodiments, the link between the DP 200 and AP 100 may be wireless as well. One or more wireless repeaters may be used between the MVIDs 300 and DP 200 and/or between the DP 200 and AP 100 in the embodiments herein. The repeaters may be daisy-chained together for bi-directional communications via time division multiplexing and/or frequency division multiplexing (e.g., a separate upstream and downstream frequency band) and may use any suitable licensed or unlicensed bands. Such frequencies may include the much used 2.4 GHz, 5 GHz, 24 GHz, and/or 60 GHz wireless bands, for example. Protocols (and therefore frequency bands) used may comprise 802.11a, b, or g, 802.16, and/or 802.21. Thus, the MVID 300 may comprise an antenna that is attached to a tower, transformer enclosure, or other structure that facilitates wireless communications.

Network 3 includes three DTs with two having a PLB 400. Each PLB 400 is configured to communicate with the MVID 300 of that network. The MVID 300 of network 3 is in communication with its DP 200 via a fiber optic link and wireless link as shown.

In networks 1 and 3, the PLBs 400 communicate with user devices in the customer premises via the low voltage power lines or, alternately, via a wireless link.

In this embodiment, the PLBs 400 provide communication services for the users, which services may include security management, routing of Internet protocol (IP) packets, filtering data, access control, service level monitoring, signal processing and modulation/demodulation of signals transmitted over the power lines.

At the user end of the PLCS, data flow originates from a user device, which may provide the data to a power line modem (PLM), which is well-known in the art.

Various electrical circuits within the customer's premises distribute power and data signals within the customer premises. The customer draws power on demand by plugging a device into a power outlet. In a similar manner, the customer may plug the PLM into a power outlet to digitally connect user devices to communicate data signals carried by the power wiring. The PLM thus serves as an interface for user devices to access the PLCS. The PLM can have a variety of interfaces for customer data appliances. For example, a PLM may include a RJ-11 Plain Old Telephone Service (POTS) connector, an RS-232 connector, a USB connector, a 10 Base-T connector, RJ-45 connector, and the like. In this manner, a customer may connect a variety of user devices to the PLCS. Further, multiple PLMs may be plugged into power outlets throughout the customer premises, with each PLM communicating over the same wiring internal to the customer premises.

The user device connected to the PLM may be any device capable of supplying data for transmission (or for receiving such data) including, but not limited to a computer, a telephone, a telephone answering machine, a fax, a digital cable box (e.g., for processing digital audio and video, which may then be supplied to a conventional television and for transmitting requests for video programming), a video game, a stereo, a videophone, a television (which may be a digital television), a video recording device, a home network device, a utility meter, or other device. The PLM transmits the data received from the user device through the customer LV power line to a PLB 400 and provides data received from the LV power line to the user device. The PLM also may be integrated with the user device, which may be a computer. In addition, the functions of the PLM may be integrated into a smart utility meter such as a gas meter, electric meter, water meter, or other utility meter to thereby provide automated meter reading (AMR) and control.

The PLB 400 typically transmits the data to the MVID, which, in turn, transmits the data to the DP 200, which transmits the data to the AP 100. The AP 100 then transmits the data to the appropriate destination, which may be a network destination (such as an Internet address) in which case the packets are transmitted to, and pass through, numerous routers (herein routers are meant to include both network routers and switches) in order to arrive at the desired destination.

System

Figure 5:
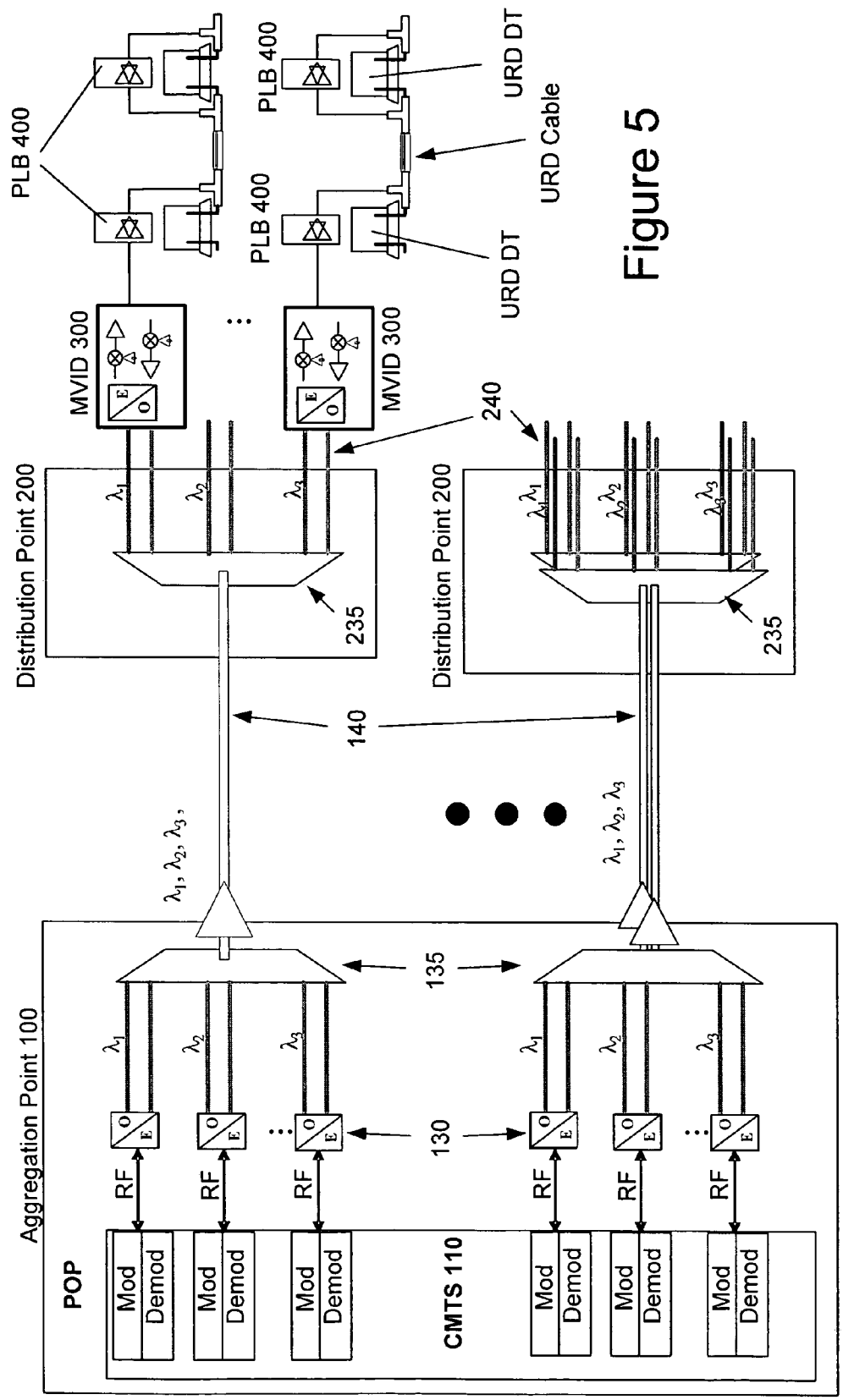
FIG. 5 is a block diagram of a portion of an example PLCS, in accordance with an embodiment of the present invention.

Referring to FIG. 5, one example of an embodiment of the system of the present invention includes an aggregation point 100 including a cable modem termination system (CMTS) 110 and an optical multiplexer/demultiplexer system. As shown, the aggregation point 100 that may be co-located with a point of presence (POP). The aggregation point 100 may be in communication with one or more distribution points 200 via one or more fiber optic cables 140. In other embodiments, this link may be a wireless link, a T1 link, a coaxial cable, or any other suitable link. Each distribution point 200 may be in communication with one or more MVIDs 300 via one or more fiber optic conductors 240. Each MVID 300 may be in communication with one or more power line bridges 400 via the URD medium voltage power line(s). The PLBs 400 may be in communication with one or more user devices that reside in the customer premises via the low voltage power lines or via a wireless link.

In this embodiment, a Frequency Division Multiplexed (FDM) channel plan may be used for allocating multiple downstream and multiple upstream communication channels. Upstream channels also may be multiplexed in the time domain (Time Division Multiple Access or TDMA) to accommodate the large number of PLBs 400 that may exist in large neighborhoods or daisy-chained MVIDs 300. For example, the PLBs 400 coupled to a URD MV cable may be configured to transmit to an MVID 300 using time division multiplexing, but in the same frequency channel (which may be different than the downstream frequency channel). Other embodiments may use other schemes, such as purely FDM for upstream channels, or Code Division Multiple Access (CDMA) which may include Synchronous CDMA (SDMA), or Time Division SCDMA (TD-SCDMA).

In this embodiment, the downstream channels (e.g., as transmitted from the MVID 300, amplified by the PLBs 400, and repeated by any repeaters) may be approximately six megahertz (6 MHz) wide. Three such channels may be used between 30 MHz and 50 MHz on the URD power lines, which has been found to be less noisy than frequencies below 30 MHz. In addition, this frequency band may be orthogonal from the frequency band (e.g., the HomePlug frequency band) used to communicate over the LV power lines with the user devices in the customer premises in this embodiment. Consequently, any communications signals that unintentionally bleed through the transformer (either from the LV side to the MV or from the MV side to the LV side) will not interfere with communications.

The downstream communications may be 256 Quadrature Amplitude Modulation (QAM) or 64 QAM, Quadrature Phase Shift Keying (QPSK), Binary Phase Shift Keying (BPSK), or any other appropriate modulation format, where spectrally efficient formats are preferred. In the case of 256 QAM, the communications may have 8 bits per symbol while if 64 QAM is used, the communications may have 6 bits per symbol. In each case, the communications may use differential encoding and have a symbol rate of more than 5 MBaud.

Upstream communications such as those transmitted by the PLBs 400 toward the MVID 300, may be both FDM and TDMA or FDM and SCDMA or simply SCDMA. Many of the communications parameters of the PLBs 400 are configured under the direction of the CMTS 110 via the MAC layer control specification. Most of these parameters are normally negotiated between CMTS 110 and the PLB MV modem (which may be a cable modem). In one embodiment, a first upstream channel has a bandwidth of approximately 1.6 MHz and may employ any of QPSK, 16 QAM, or 64 QAM. The communications may employ differential encoding and have a symbol rate of 1.28 MBaud. For QPSK communications may be at two bits per symbol, for 16 QAM four bits per symbol, and for 64 QAM six bits per symbol may be used.

A second and third upstream channel may also be 1.6 MHz wide, or alternately, may be 800 KHz wide with each having a symbol rate of 640 KBaud (and otherwise having the parameters listed above for the first upstream channel).

Depending on the layout of the network, the system may employ one upstream and one downstream channel for each URD MV cable. In other implementations, such as where more than one channel is needed due to capacity or other reasons, two, three, or more channels (upstream and/or downstream) may be used for communications over one URD MV cable. As will be evident to those skilled in the art, the MVIDs 300 may need to communicate data in all of the channels, while the PLBs may need to communicate data in all, or some subset, of the communication channels. In this embodiment, the channels (frequencies) for communications and amplification by the PLBs may be remotely controlled via a command from the PLS. There need not be the same number of upstream and downstream channels. Other embodiments of the present invention may use more or fewer channels and/or completely different communications schemes.

Aggregation Point

Figure 6:
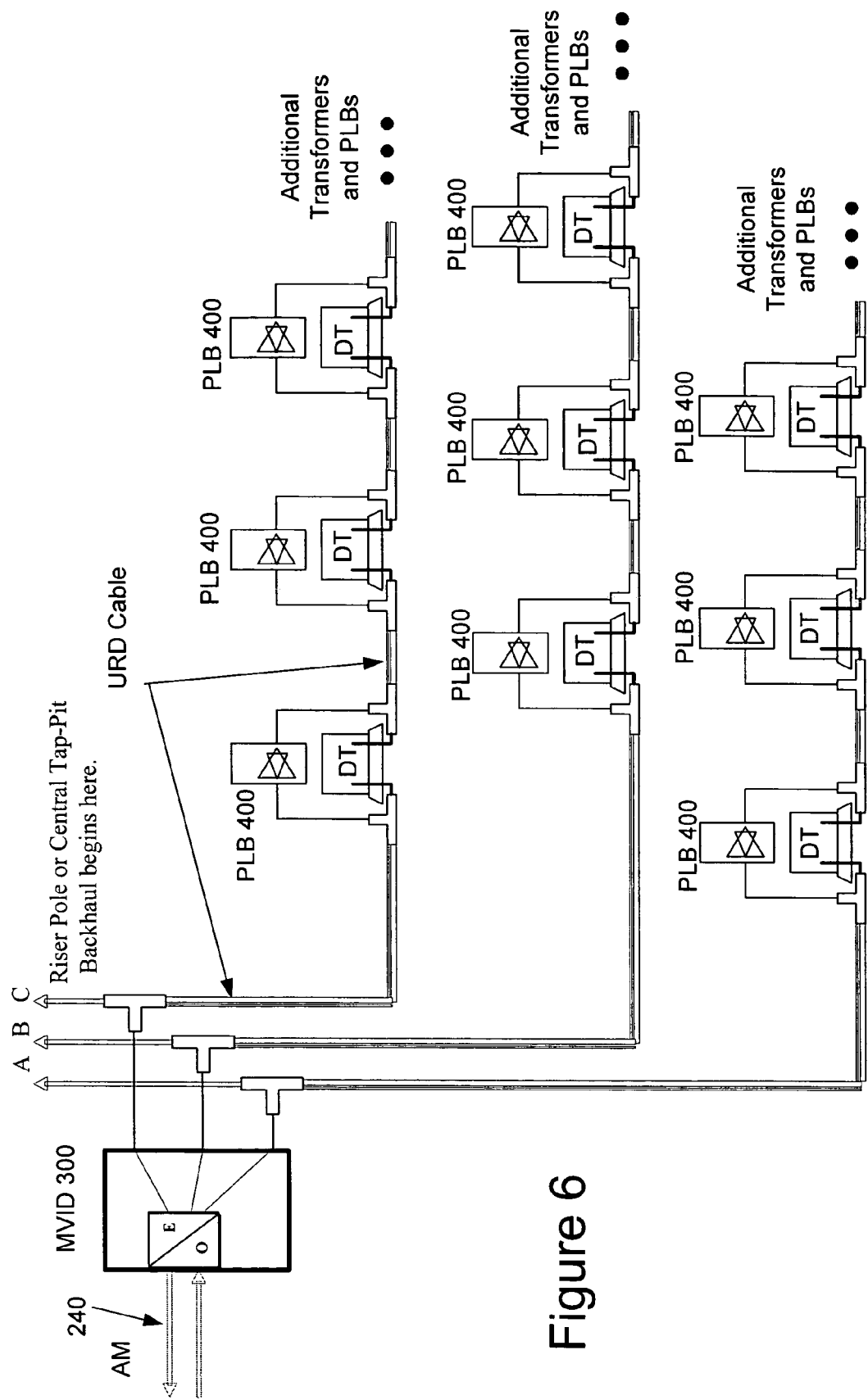
FIG. 6 is a block diagram of a portion of an example PLCS, in accordance with an embodiment of the present invention.

Referring to FIGS. 5 and 6, this example embodiment includes an aggregation point 100 that includes a CMTS 110 having a plurality of ports. The CMTS 110 may be a large CMTS or a plurality of smaller CMTSs. As is known to those skilled in the art, the output of a CMTS typically is a radio frequency electrical signal. The CMTS 110 also may serve as a master controller, providing instructions and granting requests to/from downstream devices (DPs 200, MVIDs 300, and PLBs 400). Such commands typically relate to the physical layer and may comply with MAC layer control specification of DOCSIS (Data Over Cable System Interface Specification) (e.g., DOCSIS 2.0). In other words, the commands and status requests transmitted to the network elements, and responses thereto, may substantially or fully comply with the format and protocol (e.g., the bit sequence) defined by the DOCSIS specification.

Each port of the CMTS 110 may be communicatively coupled to an Electrical-to-Optical converter (EO converter) 130. This embodiment includes a plurality of groups of EO converters 130, with each group of EO converters 130 communicating with an optical multiplexer/demultiplexer 135. All of the EO converters 130 in a group may communicate with the multiplexer/demultiplexer 135 via a different wavelength. The Optical Multiplexer/Demultiplexer 135 may include an Arrayed Waveguide Grating (AWG) or Thin Film Filter (TFF) and/or Fiber Bragg Grating (FBG). Each optical multiplexer/demultiplexer 135 receives optical signals from its corresponding EO converters 130 and multiplexes the signals onto one or more optical conductors 140. In this example embodiment, the optical multiplexer/demultiplexer 135 transmits to each distribution point 200 on one fiber conductor and receives from each distribution point on another optical fiber conductor. The output of the optical multiplexer 135 may be amplified prior to transmission onto the optical conductor. Thus, the downstream (DS) transmission from the optical multiplexer/demultiplexer 135 (or optical amplifier (OA)) may comprise a plurality of different wavelengths and the communications may be amplitude modulated and be a dense wave division multiplexed (DWDM) or coarse wave division multiplexed (CWDM) signal. In other embodiments, this link may be digital. In addition, or instead of wave division multiplexing, additional fiber conductors may be used. Thus, the AP 100 may include one or more ports for fiber optic communications and could include one or more fiber optic transceivers—although the transceiver(s) may not necessarily communicate over the same fiber optic conductor.

In the upstream direction (i.e., data transmitted from the DP 200 to the AP 100), data is received by the optical multiplexer/demultiplexer 135 and demultiplexed (based on the wavelengths of the signals in this embodiment). The demultiplexed outputs are communicated to the respective OE converter 130 which then converts the optical signal to an electrical signal. The output of the OE converter 130 is provided to the CMTS 110, which communicates the signal via the POP to the appropriate network such as the Internet or a voice network.

While this figure discloses only two distribution points 200, any number of distribution points 200 may be communicatively coupled to the aggregation point 100 provided the aggregation point 100 is suitable to handle the information capacity. In addition, while the AP 100 of FIGS. 5 and 6 utilize optical links to communicate with their DPs 200, other systems may in addition to, or instead, employ wireless, coaxial, T1, SONET, or any other suitable link, and therefore, will have the appropriate transceiver for providing such communications.

Distribution Point

The distribution point 200 receives the downstream optical signals (e.g., via an optical conductor 140) from the optical multiplexer/demultiplexer 135 of the aggregation point 100. The distribution point 200 includes a multiplexer/demultiplexer 235, that operates substantially similar to the multiplexer/demultiplexer 135 of the aggregation point 100. The DP 200 also may include a plurality of downstream ports. Thus, the DP 200 may include one or more ports for fiber optic communications and could include one or more fiber optic transceivers—although the transceiver(s) may not necessarily communicate over the same fiber optic conductor.

The multiplexer/demultiplexer 235 of the DP 200 may demultiplex the received optical signals (based on wavelength in this embodiment) and output each demultiplexed signal via one of its downstream ports. In this example embodiment, each downstream port is communicatively coupled to a MVID 300 via one or more fiber optic conductors 240. In addition, the DP 200 may convert the optical signals to optical digital signals and modulate the signals onto an optical carrier of the same, or different, wavelength. In this embodiment, each downstream port of the DP 200 communicates with the associated MVID 300 via a different wavelength, and therefore, the system uses wavelength division multiplexing.

The DP 200 also may include a cable modem (e.g., a CableLabs Certified Cable Modem) and central processing unit in order to receive and process control commands and status requests. Control and status of DPs may be accomplished by means of an in-band channel. Such signals may be transmitted from the AP 100 (e.g., from the CMTS 110 therein and may be DOCSIS commands) or PLS.

Upstream optical signals may be received from each MVID 300 via a separate port. Each upstream optical signal may be multiplexed by the DP's multiplexer/demultiplexer and communicated upstream to the aggregation point 100. The signals received from the MVID 300 by the DP 200 may be converted to optical digital signals and modulated onto an optical carrier of the same, or different, wavelength.

MVID

Each MVID 300 receives the downstream data signals from the DP 200 and converts the optical signals to electrical signals. The communications between the DP 200 and the MVIDs 300 (and between the AP 100 and DPs 200) may be amplitude modulated (AM) fiber optic signals. At the MVID 300, DOCSIS compliant RF signals (e.g., optical signals) may be converted to a frequency channel plan which is more compatible with the URD MV cable/coupler power line communications infrastructure. Thus, one function of the MVID 300 may be to shift the channels from their CATV spectral assignments to those in the URD channel plan. The MVID 300 also may serve as the optical/electrical interface device by converting downstream AM fiber signals into electrical RF signals and vice-versa for upstream signals.

As shown in FIG. 6, the MVID 300 may be communicatively coupled to one or more URD medium voltage power lines for example, at a riser pole (where the underground power line traverses up a pole to connect to an overhead power line) or at an URD transformer such as the first transformer connected to the riser pole in the URD system. In this example, the MVID 300 is coupled to all three phases (phase A, B, and C) of the three phase URD power distribution system. As shown, the MVID 300 may be in communication with one or more PLBs 400 via each URD MV power line. The URD transformers, and their associated PLBs, are connected together by a length of URD cable that typically may be up to 1000 feet in length, but may sometimes be longer.

In some embodiments, the MVID 300 may perform routing and transmit the data signals over the appropriate MV power line. Alternately, and as in this example embodiment, the MVID 300 simply converts the incoming signal from an optical signal (or a wireless signal in alternate embodiment) to an electrical signal and transmits the electrical signals down all (or some) of the URD MV power lines. As will be evident to those skilled in the art, the less processing that the MVID 300 (and other network elements) perform, the faster the network will communicate data (i.e., the system will have less latency), which is important for voice, video, and other latency sensitive applications.

PLB

The PLB 400 may include a processing section and a through section. Each PLB 400 receives the downstream data signals via the MV power line. In this example embodiment, each PLB 400 receives all the data transmitted from the MVID 300 on the MV power line to which the PLB 400 is connected. The processing section of the PLB 400 demodulates all the data signals to determine whether the data should be processed by the PLB 400 (e.g. as a command) or transmitted to the user devices on the PLB's LV subnet. If the data signals include appropriate address information (as discussed in detail below), the PLB 400 may process the data or transmit the data via the LV subnet to be received by a user device in a customer premises (not shown). If the data signals do not include the appropriate address information, the data signals may be ignored. In addition to demodulating and processing the data, the through section of the PLB 400 may amplify, filter and transmit all the data signals it receives for reception by the downstream PLBs 400.

Upstream data signals received by the PLBs 400 on the MV power line may be amplified, filtered and transmitted by the through section of the PLB 400 toward the MVID 300. Thus, each PLB 400 may include a bi-directional amplifier to amplify all the downstream (and upstream) data signals that may be attenuated as they propagate through the URD MV cable. In this embodiment, there is no need to demodulate and process the upstream data. Other embodiments, which may operate in a noise environment, may provide demodulation and modulation of MV power line upstream data at the PLB to thereby repeat the data.

The PLB 400 also receives upstream data via the LV power line from the user device(s) at the customer premises (not shown). This data may be processed and transmitted upstream by the processing section of the PLB 400 to the MVID 300. In other embodiments, the PLB 400 may communicate with devices at the customer premises via another link such as a fiber optic cable, a coaxial cable, a twisted pair, or a wireless link. (e.g., an IEEE 802.11).

System Variations

Figure 7:
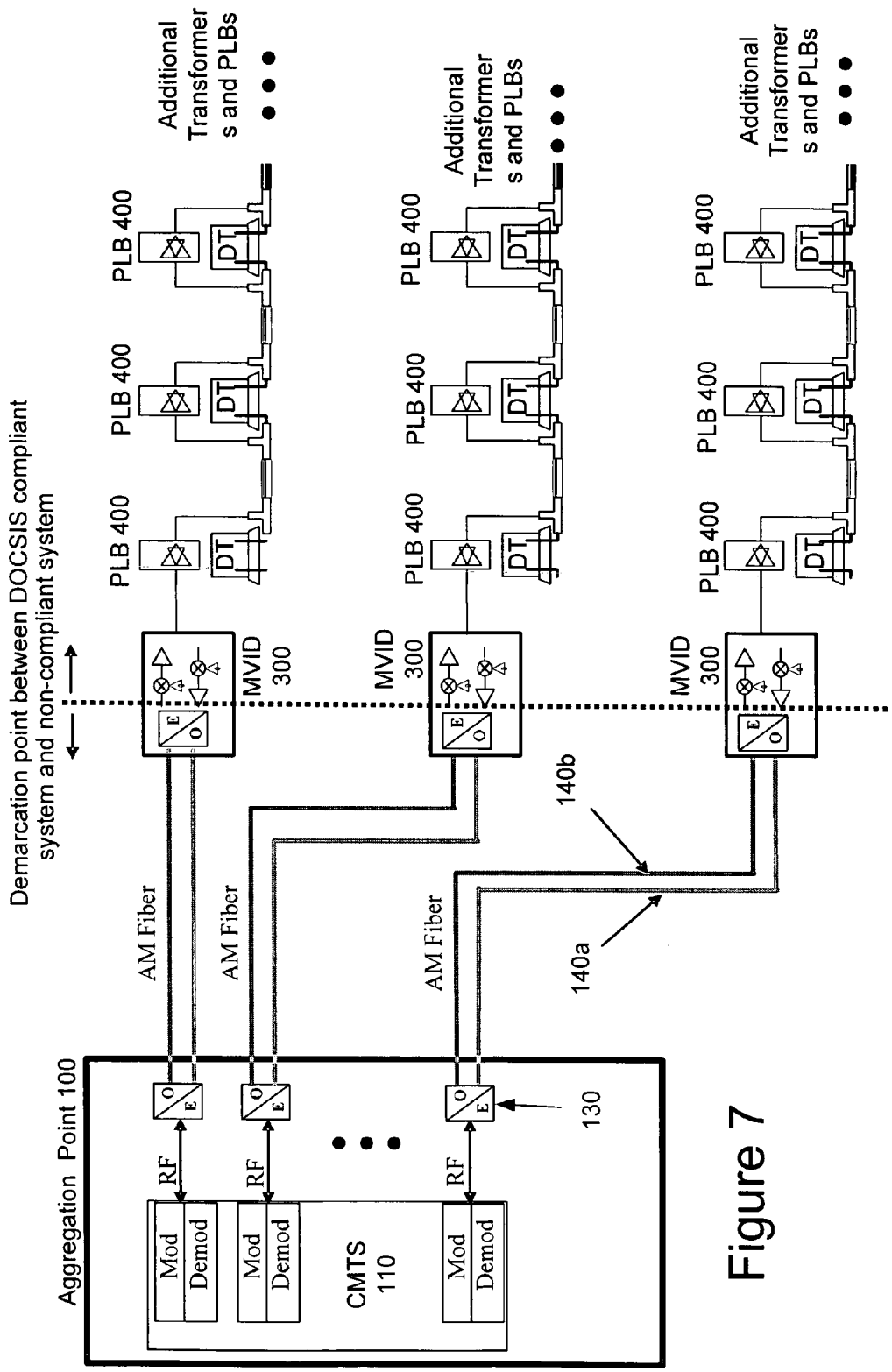
FIG. 7 is a block diagram of another example PLCS, in accordance with an embodiment of the present invention.

While the above described embodiment includes a DP 200, other embodiments may not include a DP 200. For example, FIG. 7 depicts a PLCS that does not employ a DP 200. The embodiment depicted in FIG. 7 may be suitable for single phase URD power distribution segments. The aggregation point 100 communicates directly with a plurality of MVIDs 300, which may be located in the pit of, or adjacent to, a URD transformer (instead of at the riser pole) such as the first URD transformer or the URD transformer that is most directly connected to the pole riser. In other words, the MVIDs 300 in the embodiment may be co-located with a PLB 400 and may communicate with the adjacent PLB 400 over a conventional telecommunications medium such as a coaxial cable or Ethernet cable.

The aggregation point 100 of FIG. 7 remains substantially similar to the aggregation point 100 of FIG. 5 except that there may be no multiplexer/demultiplexer present. Instead, the optical output of each OE converter 130 of the AP 100 may communicate with an associated MVID 300 via an upstream optical fiber conductor 140a and a downstream optical fiber conductor 140b using amplitude modulated fiber optic signals.

Figure 8:
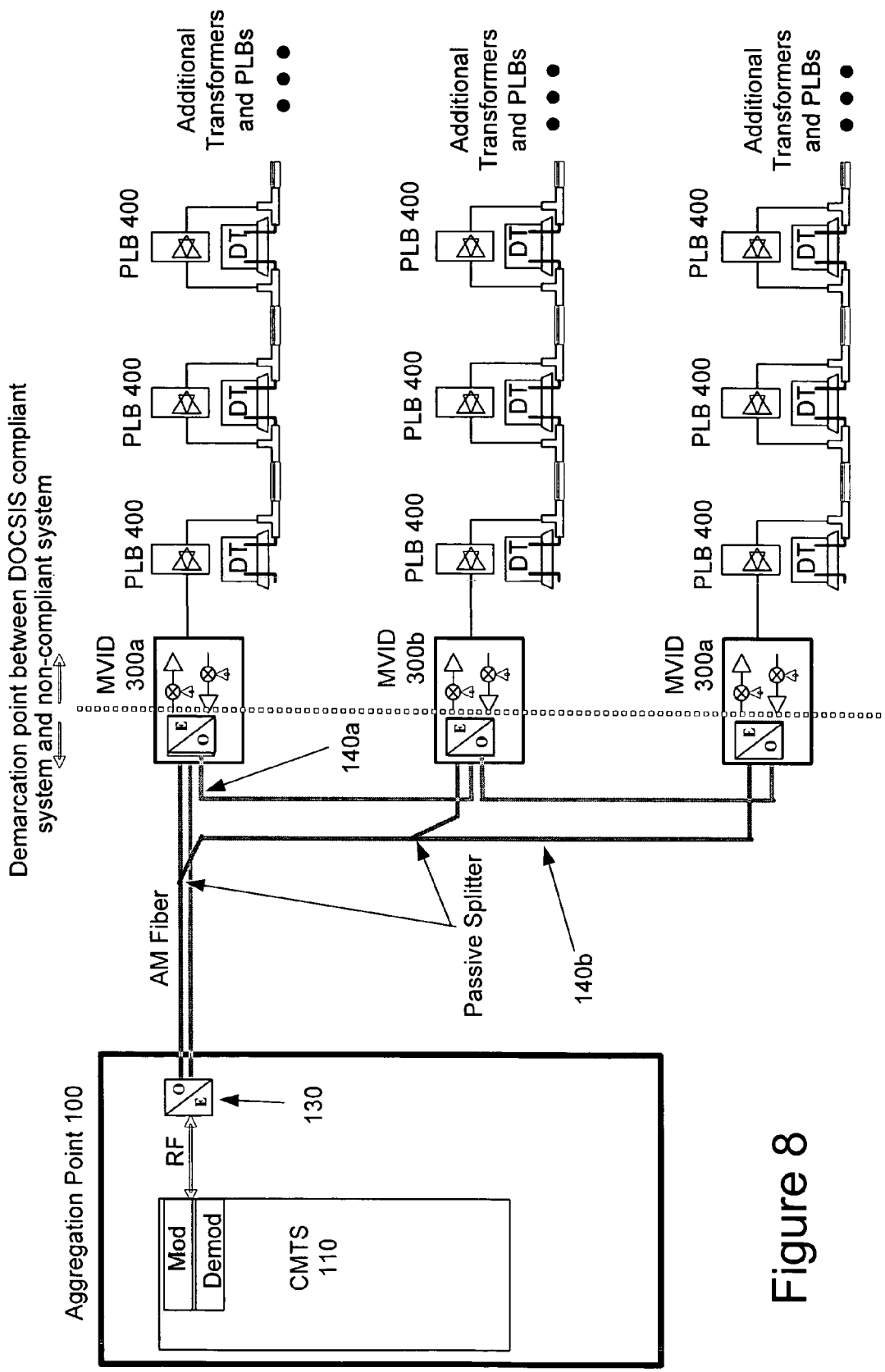
FIG. 8 is a block diagram of still another example PLCS, in accordance with an embodiment of the present invention.

FIG. 8 depicts another example system in which a DP 200 is not present and in which the AP 100 is providing communications for three different MVIDs 300. The MVIDs 300 may be located in the pit of, or adjacent to, a URD transformer (instead of at the riser pole) such as the first URD transformer or the URD transformer that is most directly connected to the pole riser. In other words, the MVIDs 300 in the embodiment may be co-located with a PLB 400 and may communicate over a conventional telecommunications medium such as a coaxial cable or Ethernet cable. The embodiment depicted in FIG. 8 may be suitable for single phase URD power distribution segments. In this example embodiment, a signal EO converter 130 provides communications to multiple MVIDs 300. As shown in FIG. 8, the downstream fiber optic link 140b between the AP 100 and the MVIDs 300 may be connected to splitters that split the signals so that all three MVIDs 300 receive all downstream communications from the AP 100. The upstream links 140a of the MVIDs 300 are chained together as shown and, therefore, are all combined on one fiber optic cable. Specifically, the upstream link 140a from MVID 300a is coupled to MVID 300b where the signals of MVID 300a and 300b may be combined (electrically). The upstream link from MVID 300b is coupled to MVID 300c where the data signals from MVID 300b (which may include signals from MVID 300a and 300b) and MVID 300c may be combined (electrically). The combined signals are then communicated to the EO converter 130 of the AP 100, where they may be converted to electrical signals and demodulated. The fiber optic signals employed in this embodiment may be amplitude modulated fiber optic signals.

Figure 9:
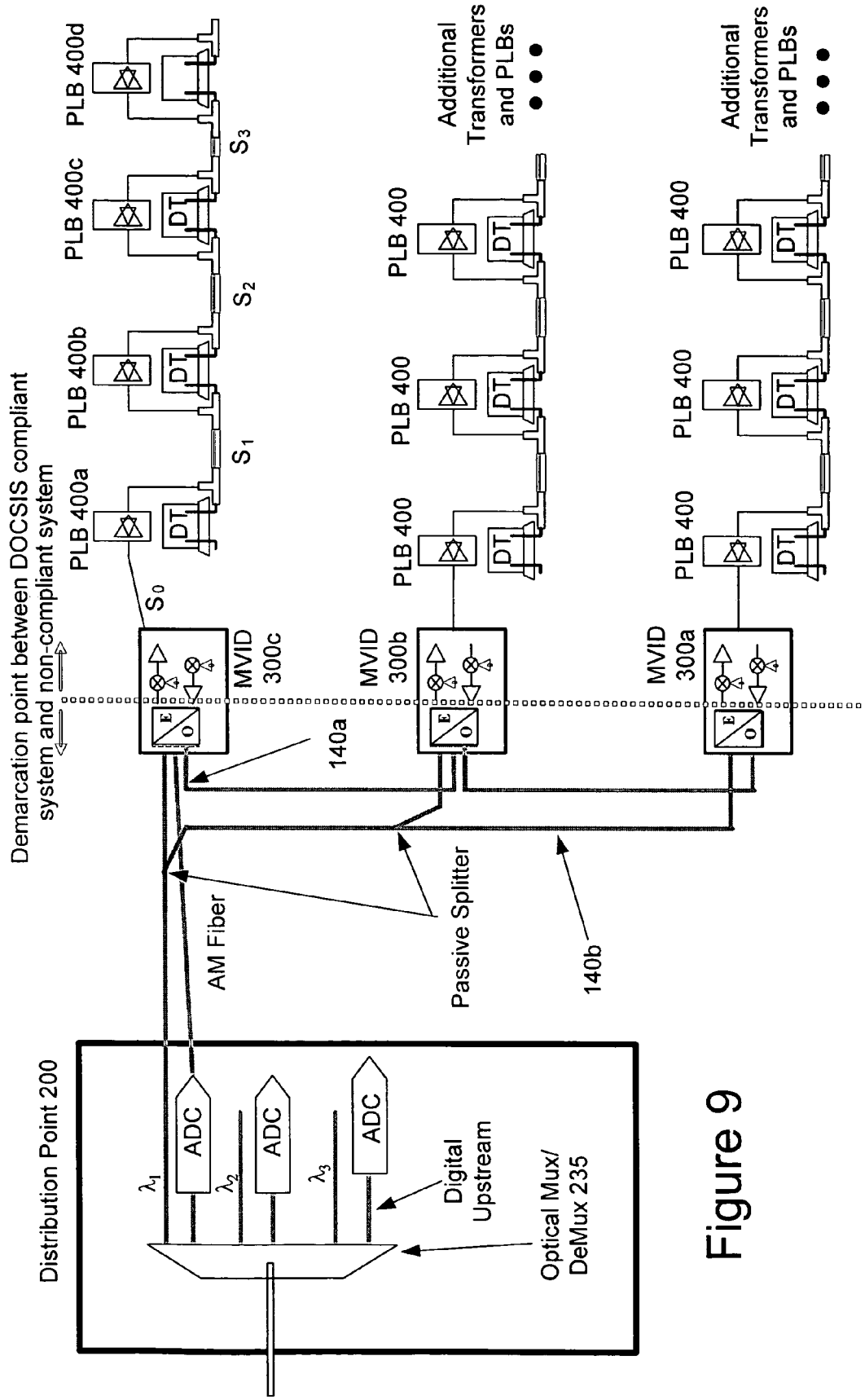
FIG. 9 is a block diagram of a portion of an example PLCS, in accordance with an embodiment of the present invention.

FIG. 9 depicts a DP 200 that communicates with its associated MVIDs 300 in substantially the same manner as the AP 100 of FIG. 8. The embodiment depicted in FIG. 9 also may be suitable for single or multi-phase URD power distribution segments. The MVIDs 300 may be located in the pit of, or adjacent to, a URD transformer (instead of at the riser pole) such as at the first URD transformer or the URD transformer that is most directly connected to the pole riser. Thus, the MVIDs 300 in the embodiment may be co-located with a PLB 400 and may communicate with that PLB 400 over a conventional telecommunications medium such as a coaxial cable or Ethernet cable. Data communicated between the MVIDs 300 and other downstream PLBs 400 may traverse through (and be amplified by) the PLB 400 with which the MVID 300 is co-located.

The DP 200 of FIG. 9 includes an analog-to-digital converter (ADC) for the upstream communications from the MVIDs 300. The ADC converts the analog optical signals from the MVIDs 300 (i.e., the amplitude modulated optical signals) to digital optical signals for upstream transmissions to the AP 100. As will be evident to those skilled in the art, the other DPs 200 and MVIDs 300 disclosed herein might also include an ADC and operate accordingly. As shown in FIG. 9, the downstream fiber optic link 140b between the DP 200 and the MVIDs 300 may be connected to splitters that split the signals so that all three MVIDs 300 receive all downstream communications form the DP 200 and, if desirable, may transmit all received data downstream to the PLBs 400. The upstream links 140a of the MVIDs 300 may be chained together as shown and discussed above and, therefore, may be combined on one fiber optic cable by the MVID 300 with which the DP 200 is most directly communicatively coupled.

MVID

Figure 10:
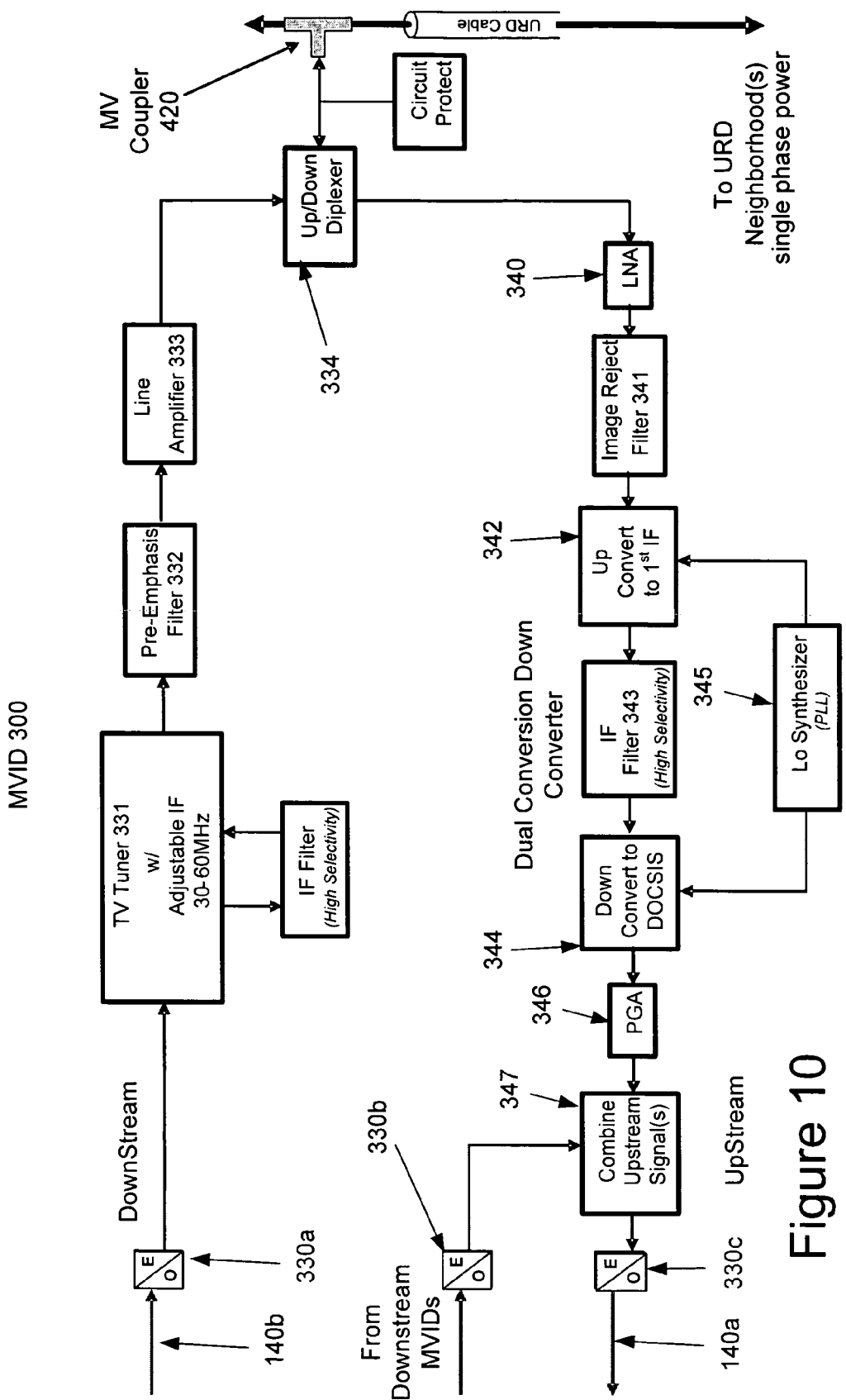
FIG. 10 is a block diagram of an example optical termination point, in accordance with an embodiment of the present invention.

FIG. 10 depicts an example embodiment of a MVID 300 that is coupled to one MV power line for communications to one or more PLBs. The MVID 300 may be installed at, or on, a utility pole at a pole riser. The MVID 300 also may be communicatively coupled to fiber optic conductors 140 for communications with an upstream device such as a DP 200 or AP 100. Such fiber optic signals may include modulated fiber optic signals, which may be amplitude modulated (as in the embodiment) or digitally modulated (i.e., be digital optical signals). In other embodiments, the MVID 300, which may be mounted at the riser pole, may include a wireless transceiver for communication with the DP 200 or AP 100 in the licensed or unlicensed frequency bands. As shown in FIG. 10, downstream data signals are received via a fiber optic cable 140b and converted from an optical to an electrical signal via an OE converter 330a. The output of the OE converter 330a is supplied to a tuner 331 or other band pass filter that may filter out all but the frequency band containing the desired information. The output of the tuner 331 may be supplied to a pre-emphasis filter. The pre-emphasis filter 332 may attenuate the signal so that certain frequencies may be transmitted with more power than other frequencies. Because higher frequencies may be attenuated more than lower frequencies by the URD cable, the pre-emphasis filter 332 may attenuate the lower frequencies more than the higher frequencies (e.g., providing a slope across the frequency band) to compensate for the anticipated loss of the URD cable. Thus, the pre-emphasized signal may be received at the other end of the URD cable as a more flat signal (e.g., having more uniform power spectrum) across the carrier frequency band than if the signal had not been pre-emphasized. In other embodiments, pre-emphasis may be performed via a pre-emphasis amplifier in addition to, or instead of, the pre-emphasis filter.

The output of the pre-emphasis filter 332 is supplied to a line amplifier 333. The signal amplified by the line amplifier 333 is supplied to a diplexer 334, which is communicatively coupled to coupler 420. An alternate embodiment, could use an a power splitter or a directional coupler or any device configured to separate the downstream and upstream signals (e.g., via frequency for FDM), which couples the downstream frequencies to the MV coupler and onto the URD MV power line for reception by the PLBs 400 instead of a diplexer. It is worth noting that this example embodiment of the MVID 300 does not route or demodulate and modulate the downstream signals and, therefore, has a lower latency than might be provided from a MVID 300 that does route, demodulate and/or modulate the signals (which would also be within the scope of the present invention).

The upstream data signals are coupled from the MV power line to the diplexer 334 (or any other device that can separate the downstream and upstream signals) via the MV coupler 420. The diplexer 334 couples the upstream frequencies to the low noise amplifier (LNA) 340, which may be connected to a band pass filter (or image filter) 341. The amplified and filtered signals are supplied to a first intermediate frequency (IF) converter 342 (e.g., a mixer that receives an input from the local oscillator (Lo) synthesizer 345 to shift the frequency) and then to an IF filter 343. Thus, the amplified and filtered signal is frequency shifted, filtered, and then supplied to a second frequency converter 344 (e.g., a mixer that receives an input from the local oscillator (Lo) synthesizer 345 to shift the frequency) which converts the data signals to the appropriate frequency for upstream transmission.

The output of the second frequency converter 344 is supplied to a programmable gain amplifier (PGA) 346. Data signals from downstream MVIDs 300 are received by EO converter 330b and converted to electrical signals. The amplified output of the PGA 346 may be combined by combiner 347 with the upstream data signals of the other downstream MVIDs 300 (that converted to electrical signals by EO converter 330b), and then provided to the upstream OE converter 330c for conversion to an optical signal for transmission upstream to a DP 200 or AP 100 (as depicted by MVID 300c shown in FIGS. 8 and 9 or the MVIDs shown in FIG. 7) or to another MVID 300 (as depicted by MVIDs 300a and 300b of FIGS. 8 and 9).

The MVID 300 also may include a cable modem (e.g., a CableLabs Certified Cable Modem) and central processing unit in order to receive and process control commands and status requests. Control and status of MVIDs (and PLBs) may be accomplished by means of an in-band channel. Such signals may be transmitted from the AP 100 (e.g., the CMTS 110 therein in the case of DOCSIS commands) or PLS.

In this embodiment the communications (both upstream and downstream) that are upstream from the MVID 300 (e.g., between the MVID 300 and DP 200 and between the DP 200 and AP 100) may employ a substantially DOCSIS (e.g. DOCSIS 2.0) (Data Over Cable System Interface Specification) compliant protocol. format, and physical layer. This is indicated by the vertical dotted line in FIGS. 7, 8, and 9. While the protocol and physical layer may be substantially DOCSIS 2.0 compliant, the mediums (e.g., fiber) and hardware (e.g., DP 200) may not be consistent with a conventional DOCSIS system. Of course, variations of DOCSIS and protocols and physical layers that are not similar to DOCSIS may be suitable as well in some embodiments. For example, a system substantially compliant with a Digital Audio Visual Council (DAVIC) specification alternately may be employed (i.e., protocol, format, commands and/or status requests thereof).

In addition, in this embodiment the communications (both upstream and downstream) that are downstream from the MVID 300 (e.g., between the MVID 300 and PLBs) may employ a substantially DOCSIS (Data Over Cable System Interface Specification) compliant protocol and physical layer and a frequency scheme that is consistent with DOCSIS.

This example embodiment uses a first frequency band for upstream communications from the PLBs 400 to their MVID 300 and a second frequency band for upstream communications from the MVIDs 300 to their upstream devices (DP 200 or AP 100). Thus, frequency translation is required by MVID 300 in this example. For example, the first frequency band (between the PLBs 400 and the MVID 300) may be from approximately 54 MHz to 100 MHz and the second frequency band (between the MVIDs 300 and the DP 200 or AP 100) may be from 5 MHz to 50 MHz. In this example embodiment, the downstream communications to the MVID 300 (from a DP 200 or AP 100) may use the same frequency as the downstream communications from the MVID 300 to its PLBs 400. Consequently, frequency translation is not required in this example embodiment. In other embodiments the downstream channels may be frequency translated (i.e., frequency shifted) by MVID 300.

Figure 11:
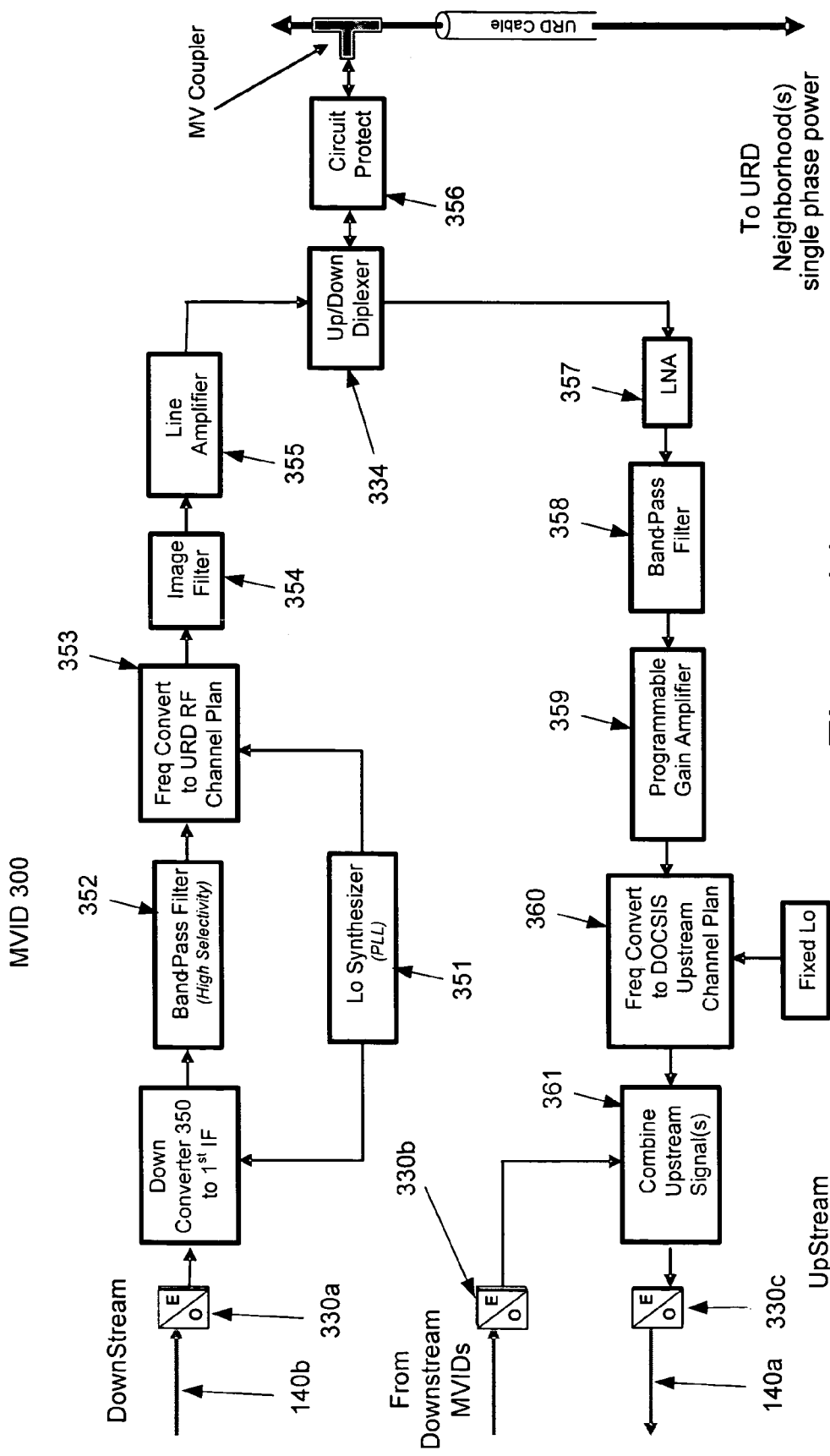
FIG. 11 is a block diagram of another example optical termination point, in accordance with an embodiment of the present invention.

FIG. 11 depicts another example embodiment of a MVID 300, which also may be installed at, or on, a utility pole at a pole riser. The MVID 300 also may be communicatively coupled to fiber optic conductors for communications with an upstream device such as a DP 200 or AP 100. Such fiber optic signals may comprise amplitude modulated fiber optic signals, but could also be digital optical signals. In this example embodiment, the downstream communications to the MVID 300 (from a DP 200 or AP 100) use a different frequency than the downstream communications from the MVID 300 to its PLBs 400. In addition, the upstream communications from the PLBs 400 to the MVID 300 employ different frequencies than the upstream communications from the MVID 300 to its upstream device (DP 200 or AP 100). Consequently, frequency translation may be required in both the upstream and downstream directions.

Thus, downstream data received by the MVID 300 from its upstream device will be converted to an electrical signal by the OE converter 330*a* and converted to an IF frequency by the first IF converter 350 (e.g., a mixer that receives an input from the Lo synthesizer 351 to shift the frequency). The output of the converter 350 may be band pass filtered by band pass filter 352 and supplied to a second frequency converter 353, which converts the signals to the frequencies used on the MV power line. The output of the second converter 353 is image filtered by image filter 354 and amplified by a line amplifier 355. The amplified signal is supplied to a diplexer 334 that couples the downstream frequencies to the MV power line via the MV coupler 420 and circuit protection circuitry 356.

Upstream data signals received from the PLBs 400 are coupled from the MV coupler 420 to the LNA 357 by the diplexer 334 and circuit protection circuitry 356. The LNA 357 amplifies the signals, which are provided to a bandpass filter 358, which filters for the band of frequencies used for upstream communications on the URD MV power line. The output of the filter 358 is supplied to a PGA 359, which amplifies the signal. The amplified signals are then supplied to a frequency converter 360 that converts the frequency band received to the frequency band used for upstream communications. Data signals from downstream MVIDs 300 are received by EO converter 330*b* and converted to electrical signals. The output of the frequency converter 360 may pass through an image rejection filter (not shown) before being combined with the upstream data signals of other MVIDs 300 (if any) by combiner 361 before being converted to amplitude modulated optical signals by the OE converter 330*c* and transmitted to the upstream device (DP 200 or AP 100).

It is worth noting that these example embodiments of the MVID 300 may not employ a modulator or demodulator for upstream or downstream communications, thereby ensuring low latency through the MVID 300.

This embodiment of the MVID 300 also may include a cable modem (e.g., a CableLabs Certified Cable Modem) and central processing unit in order to receive and process control commands and status requests as discussed above.

PLB

Figure 12:
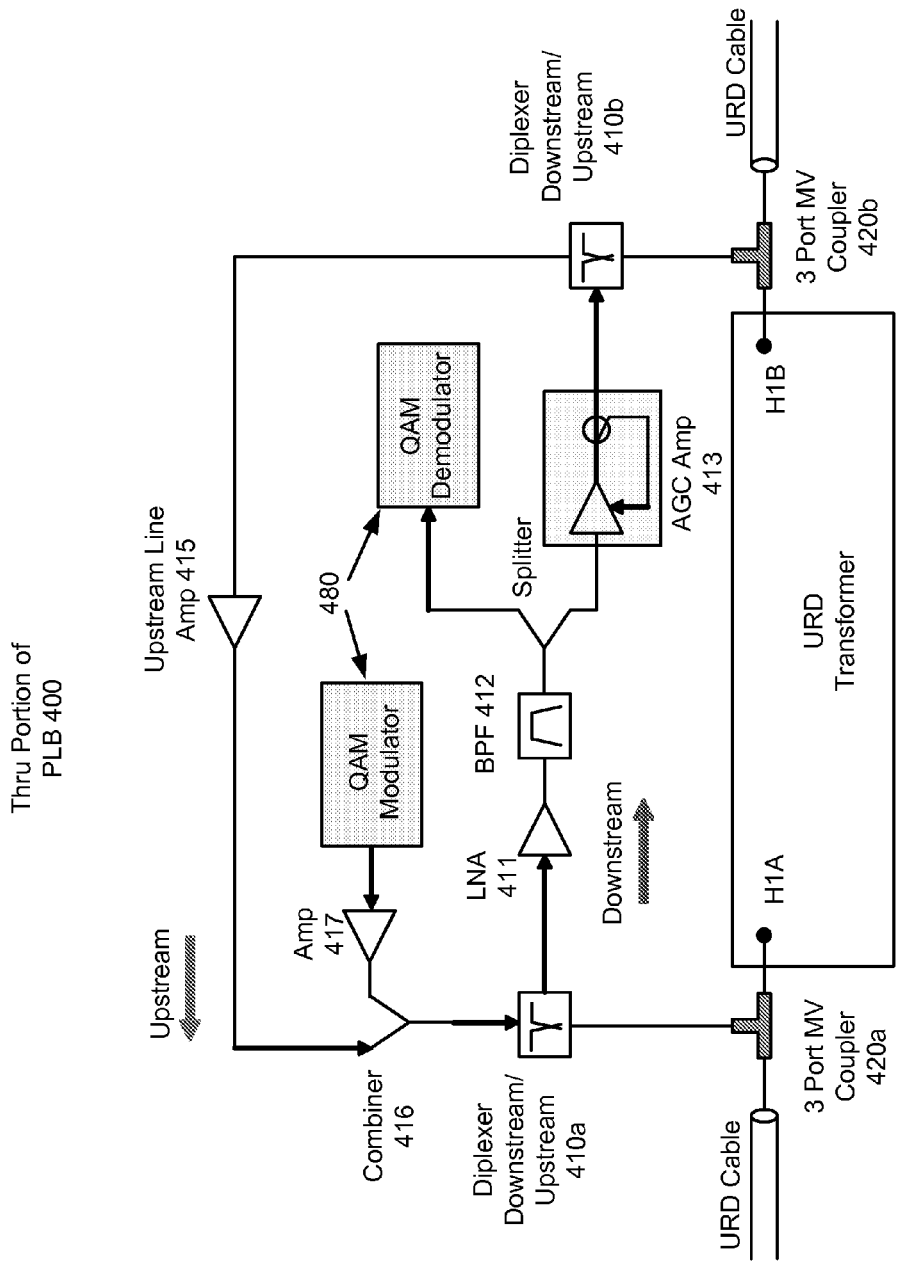
FIG. 12 is a block diagram of a portion of an example PLB, in accordance with an embodiment of the present invention.

FIG. 12 depicts a portion of an example embodiment of a PLB 400. In particular, FIG. 12 depicts the through portion of the PLB 400, which amplifies both the upstream and downstream communications frequencies. As will be discussed in more detail below, in this embodiment, communications via the MV power line use separate frequencies for upstream transmissions (from the PLB 400 to the MVID 300) and downstream transmissions (from the MVID 300 to the PLBs 400). Thus, referring to the left side of FIG. 12, the downstream frequency band is coupled to a first diplexer 410*a* (or any other device capable of isolating the downstream signals from the upstream signals) from the MV power line via the first MV coupler 420*a*. The first diplexer 410*a* couples the downstream frequencies to the LNA 411, which amplifies the signals that are then supplied to a bandpass filter 412. The bandpass filter filters for the downstream frequencies. The output of the bandpass filter 412 (which may be programmable by controller) is supplied to both a demodulator 480 and an automatic level control (ALC) amplifier 413. The output of the ALC amplifier 413 is supplied to a second diplexer 410*b* (or any other device capable of combining the downstream and upstream signals), which couples the amplified data signals of the downstream frequencies to the MV power line via the second MV coupler 420*b*. The demodulator 480 and other process related portions of the PLB 400 are discussed below.

Referring to the right side of FIG. 12, the upstream frequency band is coupled to the second diplexer 410*b* (or any other device capable of isolating the upstream signals from the downstream signals) from the MV power line via the second MV coupler 420*b*. The second diplexer 410*b* couples the data communicated in the upstream frequency band(s) to the upstream low noise amplifier 415, which amplifies the upstream signals. Thus, each PLB 400 may be equipped with bi-directional linear amplifiers. A form of "soft" automatic gain control (AGC) may be used, providing gain/power level control for downstream and upstream directions at each amplifier PLB 400. Control of this system function is under the direction of the CMTS 110 via a downstream control channel. Repeaters may also be deployed to regenerate the modulated signal on extremely long/lossy channels.

The output of the upstream low noise amplifier 415 is combined with the amplified output (amplified by amplifier 417) of the modulator 480 (e.g., via time division multiplexing, code division multiplexing, and/or as specified by DOCSIS 2.0) via combiner 416. Instead of amplifier 417, the output power of the modulator 480 could be set high (or simply be higher than permitted by federal regulations) in which case amplifier 417 may be replaced with an adjustable attenuator. The DOCSIS 2.0 specification is hereby incorporated by reference in its entirety. The amplified signal may be supplied to the first diplexer 410*a* (or any other device capable of combining the upstream and downstream signals), which couples the upstream frequencies to the MV power line via the first MV coupler 420*a* for reception by the MVID 300.

Thus, the through section of the PLB 400 amplifies both the upstream and downstream data signals (based on their frequency) without demodulating and modulating the data, thereby reducing latency (compared to if the signal was demodulated and modulated) and increasing the distance of communications via the amplification. It is has been found that the URD MV power line cables are very lossy at frequencies used to provide broadband communications. In addition, government regulations limit the amount of power that can be used to transmit such signals. Consequently, in comparison to other communications mediums, the transmitted signals will travel only relatively short distance on the URD MV power lines. Other embodiments of the PLB 400 may include demodulating and re-modulating the data signals to permit communicating long distances over the URD MV cables. However, the increased latency of the PLB 400 may reduce the quality of the time sensitive applications (e.g., voice and video delivery) to a point where such applications are precluded. In contrast, the example embodiment of the PLB 400 disclosed provides amplification of the signal in both directions without a significant latency increase.

After transmission of the data signals toward a PLB 400 (e.g., from another PLB or the MVID), the data signals will be attenuated by the URD cable, the MV couplers (e.g., the MV couplers on each end of the URD cable), and other power distribution elements (e.g., taps). The attenuation (or loss) caused by the URD MV cable is related to its length. While the loss of the MV coupler may be substantially predetermined, the distance to the PLB, and length of the URD cable, typically will vary between URD transformers. In other words, the channel loss between each PLB is not the same because the distance between each PLB, and length of the URD cable, is not the same. Consequently, even if the data signals are transmitted at the same power level toward each PLB, the data signals may be received at a different power levels at each PLB 400 due to the variances in the loss of the channel associated with each PLB 400 (i.e., variances in the lengths of the URD cables that the data signals must traverse to reach each PLB 400).

The transmit level may be defined as the average RF power spectral density (PSD) at the center frequency of the channel transmitted during the data symbols of a burst, assuming equally likely QAM symbols, and measured at the output of the PLB 400. The maximum output power levels (for both the transmissions from the PLB modem and PLB amplifiers) and associated radiated emissions must always be less than or equal to the appropriate Federal Communications Commission's Part 15 limits (i.e., $\leq P_{FCC\_Limit}$).

As discussed below, the MV coupler provides isolation to thereby attenuate signals that might otherwise traverse through the URD transformer where they could be undesirably received by the MV coupler on the other side of the transformer and create a feedback loop. Thus, the transmit levels may also (or instead) be limited by the isolation provided by the MV couplers. In summary, there is a ceiling to the output power levels of the PLB's bi-directional amplifiers (i.e., amplification power) and modem (i.e., transmit power).

As discussed, for data signals transmitted at the same power levels, the power levels of those signals when received may vary from PLB to PLB. For those PLBs receiving data signals via a short URD cable, the data signals typically will be received at higher power levels than those PLBs receiving data signals via a long URD cable. Consequently, an amplifier providing the same amplification at each PLB may not suffice, because the higher power level signals may be amplified above the FCC power limits (or above the isolation limits of the MV couplers) and/or the lower power level data signals may not be amplified enough to allow the signals to be reliably received by the next PLB 400 (or the MVID 300).

In some embodiments, an automated gain control or automatic level control amplifier may be used. However, transmissions in the upstream direction are often bursts, which do not allow enough time for an AGC or ALC amplifier to adjust the amplification. Consequently, the present invention provides a method of gain control to compensate for receiving signals of varying power levels for upstream communications. For downstream communications, in which transmissions are more constant, an ALC amplifier may be used to adjust the amplification.

Gain Alignment is the task of adjusting the gains of each PLB 400 upstream amplifier to achieve a desired overall cascaded gain. In addition, the output of the PLB 400 transmitter (e.g., transmitting data from the PLB such as user data) may also be adjusted accordingly. In this embodiment, the desirable overall cascaded gain may be ≧60 dB (<60 dB loss) from the furthest PLB 400 to the MVID 300 input. A net loss may be acceptable and may result from the accumulation of long single-URD spans that attenuate the signal more than a single upstream amplifier at a PLB 400 is capable of compensating. The 60 dB max cascaded loss is determined by the minimum carrier-to-noise (C/N) objective of this example embodiment.

While the upstream amplifiers, like the downstream amplifiers, may be gain limited (e.g., due to limited isolation between URD MV couplers), the MVID 300 gain is not limited in this manner, and may be capable of much higher gains, which will be used for signal level alignment.

In an example system shown in FIG. 9, there are four spans, $S_0$, $S_1$, $S_2$, and $S_3$. Each span will consist of two URD MV couplers and a length of URD Cable. Other spans, such as those that traverse tap-pits may have three or more MV Couplers and two or more cable spans. The variables $S_0 \ldots S_3$ represent the total equivalent power loss in dB for each span.

There are also four gain stages, $A_{MVID}$, $A_1$, $A_2$, and $A_3$. Gains $A_1$, $A_2$, and $A_3$ represent the gain in PLBs 400a, b, and c, respectively. The fourth gain stage, $A_4$, is not used in this case, as PLB 400d is the last PLB 400 in the cascade. $A_{MVID}$ is the amplifier incorporated in the MVID 300c, and is not gain limited as in the PLBs 400. $A_{MVID}$, $A_1 \ldots A_3$ are gains expressed in dB. These gains could be used, for example, to determine the amplification of adjustable (or programmable) upstream amplifier 415 in FIG. 12 for example.

$P_1$, $P_2$, $P_3$, and $P_4$ are the output power spectral densities of the PLB's transmitter (e.g., data transmitted from the MV modem) for PLB 400a, b, c, and d, respectively. They are measured in units of dBm/Hz and are controlled in the PLBs 400 by a software programmable amplifier/attenuator, which the level of the output of the transmitter (or cable modem (e.g., a CableLabs Certified Cable Modem) in this example). As discussed, these power levels must always be $\leq P_{FCC\_Limit}$. These power outputs, for example, could be used to set the amplification of adjustable (or programmable) amplifier 417 of FIG. 12, or an attenuator may be replace amplifier 417 in some embodiments.

The gain and transmit PSD settings for any PLB upstream amplifier/transmitter may be determined from the following rules:

$P_n \leq P_{FCC\_Limit}$ (expressed in dBm/Hz)
$A_n \leq A_{max}$ (maximum upstream gain)
No amplifier output level can exceed $P_{FCC\_Limit}$ In this example embodiment, the following system design objectives may be: (1) the desired cascaded system gain, including $A_{MVID}$, is 0 dB; (2) the entire PLB-MVID cascaded gain is bounded by: $-60 \text{ dB} \leq A_{total} \leq 0 \text{ dB}$; and (3) any intermediate cumulative loss be $\leq 50$ dB.

For a cascaded chain of N PLBs the following formulas may be used to compute the upstream amplifier gains and maximum upstream transmitter power spectral densities.

The upstream gain of the $n^{th}$ PLB 400 is:

$$A_n = [S_n + \Sigma(S_k - A_k), A_{max}]_{min}$$

The maximum transmit PSD for the $n^{th}$ PLB 400 is:

$$P_n = P_{FCC\_Limit} - \Sigma(S_k - A_k)$$

Based on these equations, the gains may be computed starting at the furthest PLB 400 from the MVID 300, $PLB_{N-1}$ followed by $PLB_{N-2}$ and so on until reaching the MVID 300. Also, the output power level $P_n$ of $PLB_n$ is computed after figuring the gain $A_n$ of $PLB_n$.

For the example of FIG. 9, the gains and transmission powers may be computed as follows:

$$P_4 = P_{FCC\_Limit}$$

$$A_3 = [S_3 + (S_4 - A_4), A_{max}]_{min} \text{ ($S_4$ and $A_4$ are 0, end of line)}$$

$$P_3 = P_{FCC\_Limit} - (S_3 - A_3)$$

Using $A_3$ from above, $A_2$ and $P_2$ can be calculated below as:

$$A_2 = [S_2 + (S_3 - A_3) + (S_4 - A_4), A_{max}]_{min}$$

$$P_2 = P_{FCC\_Limit} - (S_2 - A_2) - (S_3 - A_3)$$

Using $A_2$ and $A_3$ from above, $A_1$ and $P_1$ can be calculated below as:

$$A_1 = [S_1 + (S_2 - A_2) + (S_3 - A_3) + (S_4 - A_4), A_{max}]_{min}$$

$$P_1 = P_{FCC\_Limit} - (S_1 - A_1) - (S_2 - A_2) - (S_3 - A_3)$$

Using $A_1$, $A_2$ and $A_3$ from above, $A_{MVID}$ can be calculated below as:

$$A_{MVID} = [S_0 + (S_1 - A_1) + (S_2 - A_2) + (S_3 - A_3) + (S_4 - A_4), A_{max}]_{min}$$

The output power of the amplifier or transmitter may be adjusted up or down or, alternately, the output power may be set at a fixed predetermined level and attenuated to provide the desired output power.

The loss of a span ($S_n$) may be determined in any suitable manner. For example, the PLB 400 may transmit a tone, or range of tones (e.g. across all or a portion of the communications channel), at a predetermined power level (e.g. at the $P_{FCC\_Limit}$ or MV coupler limit). Based on the power level(s) of the received signal, the receiving device (e.g., a PLB 400 or MVID 300) may then determine the loss of the span. After determining the loss of the span, the software program stored in the memory of the controller of the PLB 400 may then execute the algorithms above in order to set the output gain and power of the amplifier and transmitter. The tone(s) may be transmitted at installation, periodically, when the error rate exceeds a predetermined threshold, or upon receiving a command from the CMTS 110 (of the AP 100) or PLS.

Upstream data from the user devices will be supplied to the through section via the modulator 480 as discussed below. In this embodiment, all the downstream data from the URD cable may be filtered, and demodulated for processing by the PLB 400. If the data signals are successfully demodulated, they may be transmitted to the appropriate user device.

Figure 13:
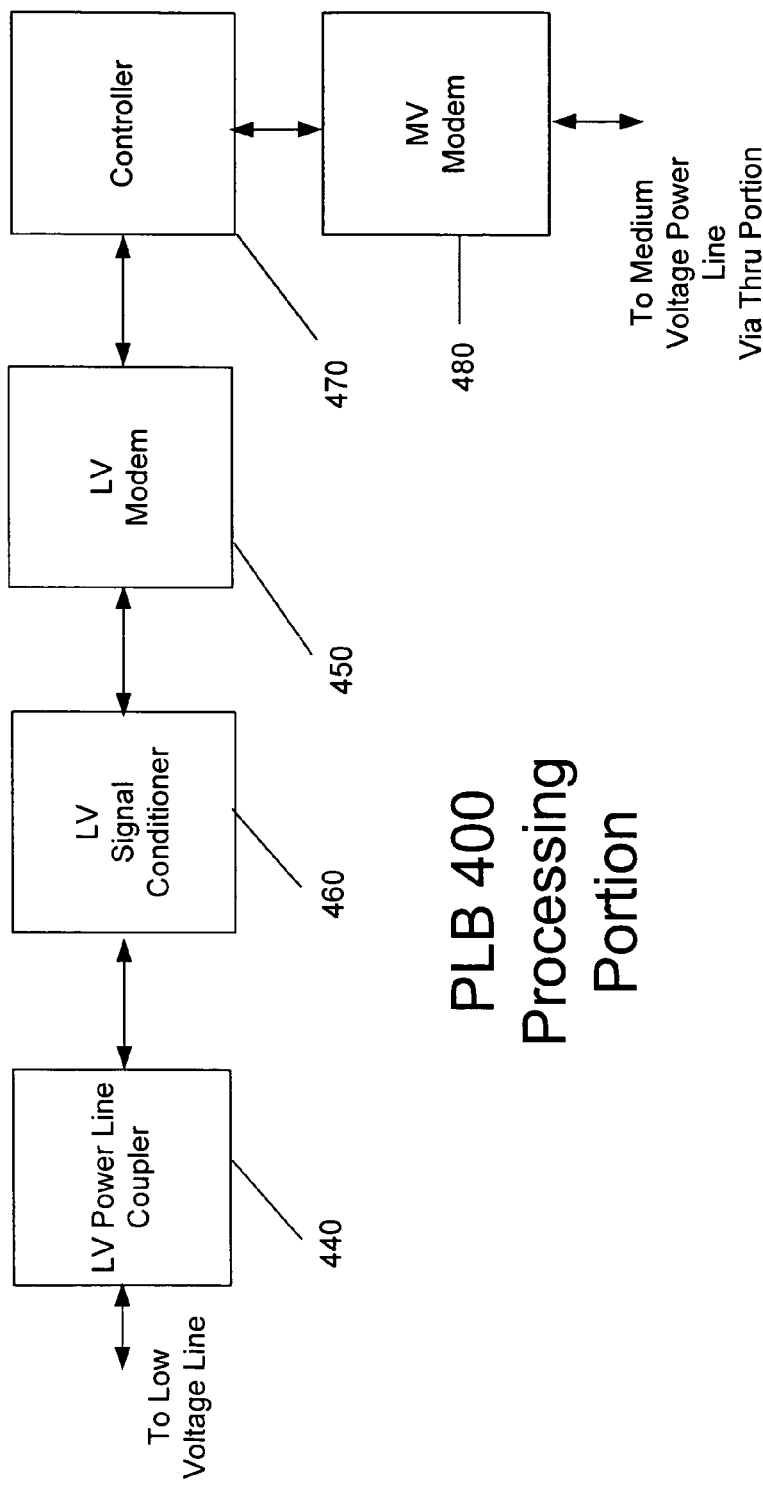
FIG. 13 is a block diagram of a portion of an example PLB, in accordance with an embodiment of the present invention.

As shown in FIG. 13, in addition to the through section shown in FIG. 12, the PLB 400 also includes a processing section that includes a MV modem 480, a controller/router 470, a LV power line coupler 440, a LV signal conditioner 460, and a LV modem 450.

The PLB 400 is controlled by a programmable processor and associated peripheral circuitry, which form part of the controller 470. The controller 470 includes memory that stores, among other things, program code, which controls the operation of the processor. The controller and modem may be integrated.

The router forms part of the controller 470 and performs routing functions. The router may perform routing functions using layer 3 data (e.g., IP addresses), layer 2 data (e.g., MAC addresses), or a combination of layer 2 and layer 3 data (e.g., a combination of MAC and IP addresses). In addition to routing, the controller 470 may perform other functions including controlling the operation of the modems. A more complete description of the controller 470 and its functionality is described below.

The controller 470 may receive and respond to commands originating from the PLS. The MV modem 480, which may be a cable modem (e.g., a CableLabs Certified Cable Modem), may receive and respond to DOCSIS commands that may originate from the CMTS 110 of the AP 100. For example, the CMTS may transmit a command (e.g., using the format and protocol defined by a DOCSIS specification) directing the MV modem 480 of the PLB 400 to use a particular upstream channel (e.g., frequency band). In response to the command, the MV modem 480 may send and an acknowledgment (and/or otherwise respond according to the DOCSIS specification) and use the designated upstream channel for future communications. The MV modem 480 may receive and process, and respond as appropriate, any of the DOCSIS commands that may be useful for the application. In some embodiments, the MV modem 480 need not be able to process every DOCSIS command defined in the DOCSIS specification. The commands processed by the controller 470 are described below. Communications between the PLS and the controller 470 of the PLB 400 may employ Simple Network Management Protocol (SNMP). In addition, the PLS may transmit a command to the controller 470 of the PLB 400 instructing the controller 470 to control or modify the operation of the MV modem 480. For example, the PLS may transmit an instruction to the controller 470 to cause the MV modem 480 to transmit the tone(s) described above in order to set the output gain and transmission power levels.

As discussed, this embodiment of the present invention provides bi-directional communications to thereby provide a first communications path from the LV power line to the MV power line and a second path from the MV power line to the LV power line. For ease of understanding, the processing, and functional components of a communication path from the LV power line to the MV power line (the LV to MV path) will be described first. Subsequently, the processing and functional components of the communication path from the MV power line to the LV power line (the MV to LV path) will be described.

As will be evident to those skilled in the art, the two paths are logical paths. The LV to MV path and the MV to LV path may be separate physical electrical paths at certain functional blocks and may be the same physical path in other functional blocks. However, other embodiments of the present invention may provide for a completely, or substantially complete, separate physical path for the LV to MV and the MV to LV paths.

LV Power Line to MV Power Line Path

In the United States, the LV power line typically includes a neutral conductor and two conductors carrying current ("energized") conductors. In the United States, the two energized conductors typically carry about 120V alternating current (AC) at a frequency of 60 Hz and are 180 degrees out of phase with each other. The present invention is suitable for LV power line cables having conductors that are spaced apart or that are coupled together (e.g., in a twisted pair or via the conductor insulation).

LV Coupler

The LV power line coupler 440 couples data to and from the LV power line and may include a transducer. The coupler 440 also may couple power from the LV power line, which is used to power at least a portion of the PLB 400. In this embodiment, the electronics of much of the PLB 400 is housed in an enclosure with first and second PLB 400 cables extending from the enclosure. The first PLB 400 cable includes a twisted pair of conductors including a signal conductor and neutral conductor. The first conductor of the first PLB 400 cable is connected to one of the energized LV conductors extending from the transformer and the second conductor of the first PLB 400 cable is connected to the neutral conductor extending from the transformer. In this embodiment, clamping the PLB 400 conductors to the LV power line conductors makes the connection.

The second PLB 400 cable extending from the enclosure is also a twisted pair comprised of a first and second conductor. The first conductor of the second PLB 400 cable is connected to the neutral conductor extending from the transformer and the second conductor of the second PLB 400 cable is connected to the second (other) energized LV conductor extending from the transformer.

The third PLB 400 cable is a ground conductor that may be connected to an earth ground, which typically is an earth ground conductor that connects the transformer housing to a ground rod. The neutral conductor of the LV power line may also be connected to the earth ground of the power line system (by the electric power company). However, there may be an intrinsic RF impedance between the PLB 400 ground conductor connection and the LV neutral conductor connections of the PLB 400 (i.e., the second conductor of the first PLB 400 cable and the first conductor of the second PLB 400 cable). Additionally, it may be desirable to add an RF impedance (e.g., an RF choke) between the connections.

In other embodiments, the LV coupler 410 may include a transducer and may be an inductive coupler such as toroid coupling transformer or a capacitive coupler, for coupling data to and/or from the LV power line and/or for coupling power from the LV power line.

In this embodiment, the signals entering the PLB 400 via the first and second PLB 400 cables (hereinafter the first signal and second signal respectively) are processed with conventional transient protection circuitry, which is well-known to those skilled in the art. Next, the first signal and second signal are processed with voltage translation circuitry. The data signals in this embodiment, which are in the 4.5 to 21 MHz HomePlug 1.0 band, "ride on" (i.e., are additive of) the low frequency power signal (the 120V 60 Hz voltage signal). Consequently, in this embodiment, it is desirable to remove the low frequency power signal, but to keep the data signals for processing, which is accomplished by the voltage translation circuitry. The voltage translation circuitry may include a high pass filter to remove the low frequency power signal and may also (or instead) include other conventional voltage translation circuitry.

Next, the first and second signals may be processed with impedance translation circuitry, which is well-known in the art. In this embodiment, it is desirable to substantially match the impedance of the LV power line. One method of matching the impedance of the LV power line is to separately terminate the PLB 400 LV conductors of the first and second PLB 400 cables through a termination resistor to ground. The value of the termination resistor may be selected to match the characteristic impedance of the LV power line.

The electronics of the PLB 400 may be powered by power received from the LV power line. Thus, this embodiment of the PLB 400 includes a power supply for powering much of the PLB 400 electronics. The power supply may include its own transient protection circuitry, which may be in addition to, or instead of, the transient protection circuitry that processes the data signals described above. Thus, the power supply may receive power from the PLB 400 LV conductor of the first (or second) PLB 400 cable after the power signal passes through the transient protection circuitry.

In addition to the power supply, the PLB 400 may include a battery backup for operating the PLB 400 during power outages. Thus, a backup power system (which may include a battery) may allow the device to detect a power outage and communicate information relating to the outage to the utility company and/or PLS. In practice, information of the outage may be transmitted to the PLS, which communicates the location, time, and/or other information of the outage to the power utility (e.g., the utility's computer system). The backup power system also may allow the PLB 400 to communicate certain data packets during a power outage. For example, during an outage, the PLB 400 may be programmed to communicate all voice data, only emergency voice transmissions (e.g., phone calls dialed to 911), or a notice of the power outage.

LV Signal Conditioner

Figure 14A:
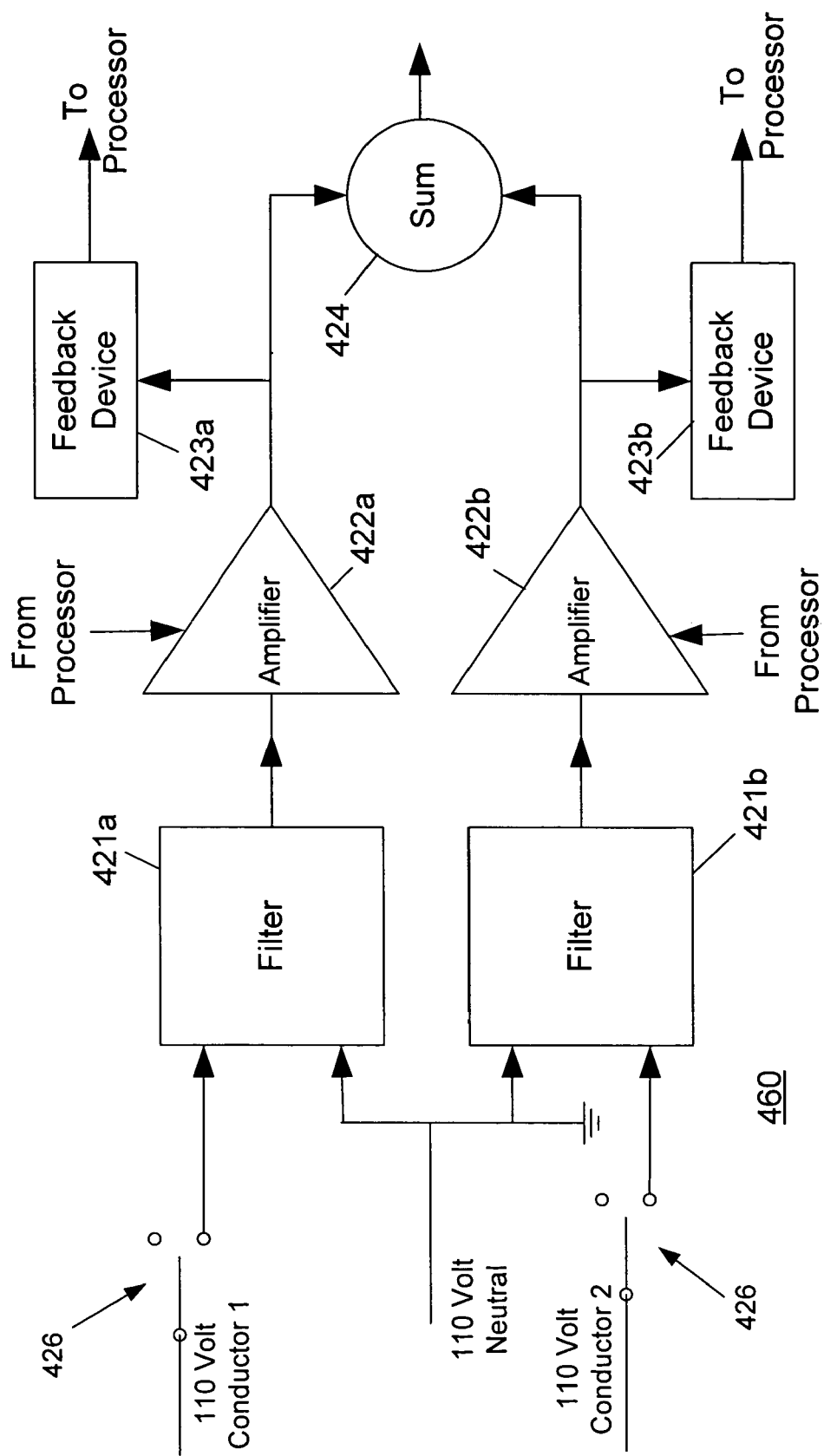
FIGS. 14a-c are functional block diagrams of a portion of a PLB, in accordance with various embodiments of the present invention.
Figure 14B:
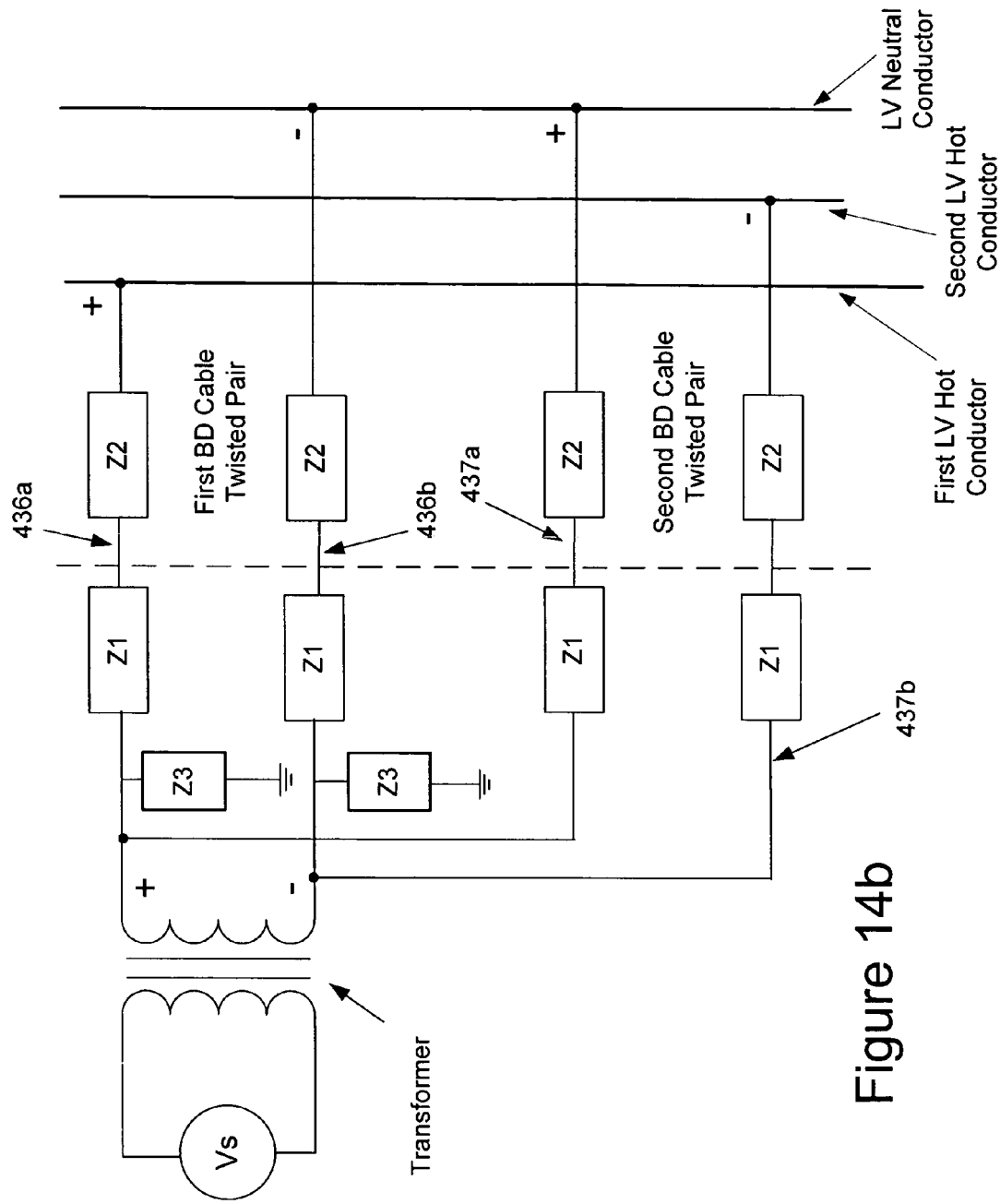

The data signals are received via the transmit/receive circuitry, examples of which (as well as other circuitry) are shown in FIGS. 14*b* and *c* and are discussed below. As shown in FIG. 14*a*, after passing through the transmit/receive circuitry and LV transmit/receive switch 426 (which would be in receive mode) the first signal (comprising data signals from the PLB 400 LV conductor of the first cable) is supplied to a first filter 421*a* that has a pass band of approximately 4.0 to 10 MHz. The second signal (comprising data signals from the PLB 400 LV conductor of the second PLB 400 cable) is supplied to a second filter 421*b* that has a pass band of approximately 10-21 MHz. Each of these filters 421 provides pass band filtering and may also provide anti-aliasing filtering for their respective frequency bands, and noise filtering.

The outputs of the first and second filters 421*a-b* are supplied to a first amplifier 422*a* and second amplifier 422*b*, respectively. The outputs of the first and second amplifiers 422*a-b* are coupled to a first feedback device 423*a* and a second feedback device 423*b*, respectively. Each feedback device 423 measures the power over time and supplies the power measurement to the controller 470. Based on the power measurement, the controller 470 increases, decreases, or leaves the gain of the associated amplifiers the same to provide automatic gain control (AGC). The outputs of the first and second amplifiers 422 are also supplied to a summation device 424 that sums the two pass band, amplified signals to provide a single data signal.

Thus, the gain of the second amplifier 422b, which receives signals in the 10-21 MHz band, may be greater (or may be dynamically made greater) than the gain of the first amplifier 422a, which receives signals in the 4.5 to 10 MHz band. The higher gain of the second amplifier filter 422b can thus compensate for the greater loss of the transmission channel at the higher frequencies.

In this embodiment, the amplification by the amplifiers 422 is accomplished by amplifying the signal a first predetermined amount, which may be the same or different (e.g., such as proportional to the anticipated loss of the channel) for each amplifier. The amplified signal is then attenuated so that the resultant amplified and subsequently attenuated signal is at the appropriate amplification with respect to the original signal, which may be determined by controller 470 from information received by the feedback devices 423. The feedback device 423 may be implemented with suitable feedback architecture, well-known to those skilled in the art. For example, the feedback devices 423 may use both hardware (such as feedback that may be provided by an analog to digital converter) and software (such as in modifying the reference voltage supplied to an operational amplifier that is implementing the amplifier 422).

Other embodiments may not include filtering the inputs of the two PLB 400 LV conductors at separate pass bands and separately amplifying the filtered signals. Instead, the signal may be filtered and amplified across the entire LV power line communication pass band (e.g., from 4.5 to 21 MHz). Similarly, while this embodiment divides the LV power line communication channel into two bands (for filtering, amplifying and summing), other embodiments may similarly divide the LV power line communication channel into three, four, five or more bands (for filtering, amplifying and summing).

LV Modem

The LV modem 450 may include a modulator and demodulator. The LV modem 450 also may include one or more additional functional submodules such as an Analog-to-Digital Converter (ADC), Digital-to-Analog Converter (DAC), a memory, source encoder/decoder, error encoder/decoder, channel encoder/decoder, MAC (Media Access Control) controller, encryption module, and decryption module. These functional submodules may be omitted in some embodiments, may be integrated into a modem integrated circuit (chip or chip set), or may be peripheral to a modem chip. In the present example embodiment, the LV modem 450 is formed, at least in part, by part number INT5130, which is an integrated power line transceiver circuit incorporating most of the above-identified submodules, and which is manufactured by Intellon, Inc. of Ocala, Fla. Thus, the modem may be a Homeplug compatible (1.0 or AV) modem.

The incoming signal is supplied to an ADC to convert the incoming analog signal to a digital signal. The digital signal is then demodulated. The LV modem 450 then provides decryption, source decoding, error decoding, channel decoding, and media access control (MAC) all of which are known in the art and, therefore, not explained in detail here.

With respect to MAC, however, the LV modem 450 may examine information in the packet to determine whether the packet should be ignored or passed to the router. For example, the modem 450 may compare the destination MAC address of the packet with the MAC address of the LV modem 450 (which is stored in the memory of the LV modem 450). If there is a match, the LV modem 450 removes the MAC header of the packet and passes the packet to the router. If there is not a match, the packet may be ignored.

Router

The data packets from the LV modem 450 may be supplied to the router, which forms part of the controller 470. The router performs prioritization, filtering, packet routing, access control, and encryption. The router of this example embodiment of the present invention uses a table (e.g., a routing table) and programmed routing rules stored in memory to determine the next destination of a data packet. The table is a collection of information and may include information relating to which interface (e.g., LV or MV) leads to particular groups of addresses (such as the addresses of the user devices connected to the customer LV power lines), priorities for connections to be used, and rules for handling both routine and special cases of traffic (such as voice packets and/or control packets).

The router will detect routing information, such as the destination address (e.g., the destination IP address) and/or other packet information (such as information identifying the packet as voice data), and match that routing information with rules (e.g., address rules) in the table. The rules may indicate that packets in a particular group of addresses should be transmitted in a specific direction such as through the LV power line (e.g., if the packet was received from the MV power line and the destination IP address corresponds to a user device connected to the LV power line), repeated on the MV line (e.g., if the PLB 400 is acting as a repeater), or be ignored (e.g., if the address does not correspond to a user device connected to the LV power line or to the PLB 400 itself).

As an example, the table may include information such as the IP addresses (and potentially the MAC addresses) of the user devices on the PLB's LV subnet, the MAC addresses of the power line modems on the PLB's LV subnet, the MV subnet mask (which may include the MAC address and/or IP address of the PLBs 400, DP 200 (if any) or AP 100 (if any)), and the IP address of the LV modem 450 and MV modem 480. Based on the destination IP address of the packet (e.g., an IP address), the router may pass the packet to the MV modem 480 for transmission on the MV power line. Alternately, if the IP destination address of the packet matches the IP address of the PLB, the PLB 400 may process the packet as a request for data.

In other instances, such as if the user device is not provisioned and registered, the router may prevent packets from being transmitted to any destination other than a DNS server or registration server of the PLCS operator. In addition, if the user device is not registered, the router may replace any request for a web page received from that user device with a request for a web page on the registration server (the address of which is stored in the memory of the router) of the operator of the PLCS.

The router may also prioritize transmission of packets. For example, data packets determined to be voice packets may be given higher priority for transmission through the PLB 400 than data packets so as to reduce delays and improve the voice connection experienced by the user. Routing and/or prioritization may be based on IP addresses, MAC addresses, subscription level, or a combination thereof (e.g., the MAC address of the power line modem or IP address of the user device).

MV Modem

Similar to the LV modem 450, the MV modem 480 receives data from the router and includes a modulator and demodulator. In addition, the MV modem 280 also may include one or more additional functional submodules such as an ADC, DAC, memory, source encoder/decoder, error encoder/decoder, channel encoder/decoder, MAC controller, encryption module, and decryption module. These functional submodules may be omitted in some embodiments, may be integrated into a modem integrated circuit (chip or chip set), or may be peripheral to a modem chip. In this example embodiment the MV modem may be comprised of a DOCSIS compliant modem (e.g., DOCSIS 2.0), which may be a cable modem (e.g., a CableLabs Certified Cable Modem).

The modem may employ QAM digital modulation such as 16, 64, and/or 256-QAM. Different digital modulation formats may be used for downstream and upstream channels. Downstream channels may use 64 or 256 QAM, while upstream channels may use QPSK, or 16 or 64 QAM. In one embodiment, and as discussed above, three downstream channels may be used, with each having a bandwidth of approximately 6 MHz and located in the 30-50 MHz band. The band has been found to have less noise from consumer appliances and less interference from higher frequency television bands. One channel may centered at approximately 32.7 MHz which as been found to have a lower cable loss than some other frequencies. The upstream channels, which may comprise three or more channels, may be in the available spectrum between 72 MHz and 76 MHz.

In another embodiment, the MV modem 480 is formed, at least in part, by part number INT5130, which is an integrated power line transceiver circuit incorporating most of the identified submodules and which is manufactured by Intellon, Inc. of Ocala, Fla.

The incoming signal from the router (i.e., the controller) is supplied to the MV modem 480, which may provide MAC processing, for example, by adding a MAC header that includes the MAC address of the MV modem 480 as the source address and the MAC address of the upstream device as the destination MAC address. In addition, the MV modem 480 also may provide channel encoding, source encoding, error encoding, and encryption. The data is then modulated and provided to the DAC to convert the digital data to an analog signal.

First MV Signal Conditioner

The modulated analog signal from the MV modem 480 is provided to first MV signal conditioner (not shown), which may provide filtering (anti-alias, noise, and/or band pass filtering) and amplification. In addition, the MV signal conditioner 260 may provide frequency translation. In this embodiment, translation of the frequency is accomplished through the use of a local oscillator and a conversion mixer. This method and other methods of frequency translation are well known in the art and, therefore, not described in detail.

As is known in the art, frequency translation may result in a first and second image of the original frequency although in some instances, such as in the present embodiment, only one of the two images is desired. Thus, the frequency translation circuitry may include an image rejection filter to filter out the undesired image leaving only the desired frequency bandwidth, which in this embodiment is the higher frequency band of the MV power line.

The output of the MV signal conditioning circuitry is supplied to the through portion of the PLB 400 shown in FIG. 12. In summary, the output of the MV signal conditioning circuitry may be supplied to an amplifier and combiner and then coupled onto the URD MF power line to conduction to the MVID 300 (perhaps via other PLB 400 through portions).

MV Power Coupler Line

The coupling device couples the data onto the URD MV power line. The coupling device may be inductive, capacitive, conductive, a combination thereof, or any suitable device for communicating data signals to and/or from the MV power line. In this example embodiment, the MV coupler is a three port device, with a first port coupling data to the PLB 400, a second port coupling power signals to or from the distribution transformer (while impeding or filtering data signals), and a third port coupling both data and power to the URD MV power line. Thus, the first port may include a high pass filter to permit the data signals to pass, but to impede the lower frequency power signals. The second port may comprise a low pass filter (or high frequency attenuator) to allow the low frequency power signals to pass substantially unimpeded. Thus, the two URD MV power cables connected to the transformer may be considered separate communication channels. One example of such a coupler is described in U.S. application Ser. No. 10/947,929 filed Sep. 23, 2004, entitled "Power Line Coupling Device and Method of Using the Same," which is hereby incorporated by reference in its entirety.

Path from MV Power Line to LV Power Line

As discussed the MV power line coupler also receives data signals from the MV power line via a coupling device, which may take the form of any of those coupling devices described above. The data signals from the MV coupler may pass through transient suppression circuitry, and impedance translation circuitry. In addition, the signals traverse the diplexer 410a, the LNA, the bandpass filter, and the splitter of the thru section of the PLB 400 to be received by the MV modem 480 as shown in FIG. 12.

MV Modem

The MV modem 480 and LV modem 450 provide a bi-directional path and form part of the MV to LV path and the LV to MV path. The components of the MV modem 480 have been described above in the context of the LV to MV path and are therefore not repeated here. The incoming signal may be supplied to the ADC to convert the incoming analog signal to a digital signal. The digital signal is then demodulated. The modem then provides decryption, source decoding, error decoding, and channel decoding all of which are known in the art and, therefore, not explained in detail here.

The MV modem 480 also provides MAC processing through the use of MAC addresses. In one embodiment employing the present invention, the MAC address is used to direct data packets to the appropriate device. The MAC addresses may provide a unique identifier for one or more of the devices on the PLC network including, for example, user devices, PLBs, power line modems, repeaters (if any), MVIDs 300, DPs 200, and APs 100. However, in some implementation, some of these network elements may not have an address (e.g., a MVID).

The routing upstream device (e.g., a MVID, DP 200 or AP 100) may determine the MAC address of the MV modem 480 of the PLB 400 servicing the user device. The information for making this determination may be stored in a table in the memory of the upstream device. The upstream device may remove the MAC header of the packet and add a new header that includes the MAC address of the transmitting device (as the source address) and the MAC address of the PLB 400 (the destination address)—or more specifically, the MAC address of the MV modem 280 of the destination PLB.

Thus, in this embodiment, packets destined for a user device on a LV subnet of a PLB 400 (or to the PLB) are addressed to the MAC address of the MV modem 480 of the PLB 400 and may include additional information (e.g., the destination IP address of the user device) for routing the packet to devices on the PLB's LV subnet.

If the destination MAC address of the received packet does not match the MAC address of the MV modem 480, the packet may be discarded (ignored). If the destination MAC address of the received packet does match the MAC address of the MV modem 480, the MAC header may be removed from the packet and the packet is supplied to the router for further processing.

There may be a different MAC sublayer for each physical device type such as for user devices and PLCS network elements (which may include any subset of devices such as MVIDs 300, PLBs 400, repeaters, DPs 200, and aggregation points 100).

Router

As discussed above, upon reception of a data packet, the MV modem 480 of a PLB 400 will determine if the destination MAC address of the packet matches the MAC address of the MV modem 480 and, if there is a match, the packet is passed to the router. If there is no match, the packet is discarded.

In this embodiment, the router analyzes packets having a destination IP address to determine the destination of the packet which may be a user device or the PLB 400 itself. This analysis includes comparing the information in the packet (e.g., a destination IP address) with information stored in memory, which may include the IP addresses of the user devices on the PLB 400 LV subnet. If a match is found, the router routes the packet through to the LV modem 450 for transmission on the LV power line. If the destination IP address matches the IP address of the PLB, the packet is processed as a command or data intended for the PLB 400 (e.g., by the Command Processing software described below) and may not be passed to the LV modem 450.

The term "router" is sometimes used to refer to a device that routes data at the IP layer (e.g., using IP addresses). The term "switch" is sometimes used to refer to a device that routes at the MAC layer (e.g., using MAC addresses). Herein, however, the terms "router", "routing", "routing functions" and the like are meant to include both routing at the IP layer and MAC layer. Consequently, the router of the present invention may use MAC addresses instead of, or in addition to, IP addresses to perform routing functions.

For many networks, the MAC address of a network device will be different from the IP address. Transmission Control Protocol (TCP)/IP includes a facility referred to as the Address Resolution Protocol (ARP) that permits the creation of a table that maps IP addresses to MAC addresses. The table is sometimes referred to as the ARP cache. Thus, the router may use the ARP cache or other information stored in memory to determine IP addresses based on MAC addresses (and/or vice versa). In other words, the ARP cache and/or other information may be used with information in the data packet (such as the destination IP address) to determine the routing of a packet (e.g., to determine the MAC address of the power line modem communicating with the user device having the destination IP address).

In an alternate embodiment using IP address to route data packets, all packets received by the MV modem 480 may be supplied to the router. The router may determine whether the packet includes a destination IP address that corresponds to a device on the PLB's LV subnet (e.g., an address corresponding to a user device address or the PLB's address). Specifically, upon determining the destination IP address of an incoming packet, the router may compare the identified destination address with the addresses of the devices on the subnet, which are stored in memory. If there is a match between the destination address and the IP address of a user device stored in memory, the data is routed to the LV power line for transmission to the user device. If there is a match between the destination address and the IP address of the PLB 400 stored in memory, the data packet is processed as a command or information destined for the PLB.

In addition, the router may also compare the destination address with the IP address of the upstream device, other PLBs. If there is no match between the destination address and an IP address stored in memory, the packet is discarded (ignored).

According to any of these router embodiments, if the data is addressed to an address on the PLB's LV, the router may perform any or all of prioritization, packet routing, access control, filtering, and encryption.

As discussed, the router of this example embodiment of the present invention may use a routing table to determine the destination of a data packet. Based on information in the routing table and possibly elsewhere in memory, the router routes the packets. For example, voice packets may be given higher priority than data packets so as to reduce delays and improve the voice connection experienced by the user. The router supplies data packets intended for transmission along the LV power line to the LV modem 450.

LV Modem

The functional components of the LV Modem 450 have been described above in the context of the LV to MV path and, therefore, are not repeated here. After receiving the data packet from the router, the LV modem 450 provides MAC processing, which may comprise adding a MAC header that includes the source MAC address (which may be the MAC address of the LV modem 450) and the destination MAC address (which may be the MAC address of the power line modem corresponding to the user device identified by the destination IP address of the packet).

To determine the MAC address of the power line modem that provides communications for the user device identified by the destination IP address of the packet, the LV modem 450 first determines if the destination IP address of the packet is an IP address stored in its memory (e.g., stored in its bridging table). If the IP address is stored in memory, the LV modem 450 retrieves the MAC address for communicating with the destination IP address (e.g., the MAC address of the power line modem) from memory, which will also be stored therein. If the IP address is not stored in memory, the LV modem 450 transmits a request to all the devices to which it is coupled via the low voltage power line (e.g., all the power line modems). The request is a request for the MAC address for communicating with the destination IP address of the packet. The device (e.g., the power line modem) that has the MAC address for communicating with the destination IP address will respond by providing its MAC address. The LV modem 450 stores the received MAC address and the IP address for which the MAC address provides communications in its memory (e.g., in its bridging table). The LV modem 450 then adds the received MAC address as the destination MAC address for the packet.

The packet is then channel encoded, source encoded, error encoded, and encrypted. The data is then modulated and provided to the DAC to convert the digital data to an analog signal.

LV Signal Conditioner

The output of the LV modem 450 is provided to the LV signal conditioner 460, which conditions the signal for transmission. Knowing (or determining) the frequency response (or loss) of the LV power line transmission channel allows the device to predistort or pre-emphasize signals prior to transmission to compensate for anticipated losses at certain frequencies or frequency ranges. During and/or prior to transmission, the amount of amplification necessary for particular frequency ranges may be periodically determined according to methods known in the art to provide dynamic predistortion (i.e., changing the amount of amplification of all or portions (e.g., frequencies or frequency ranges) of the signal over time of the transmitted signal. The determination of the desired amount of amplification may, for example, be determined and/or relate to the amount of amplification performed by amplifiers in the LV to MV path. Alternately, the amplification may be characteristic for a particular type of channel (e.g., overhead or underground), or measured for a channel, and the predistortion thus may be fixed (preprogrammed and/or hardwired into the device).

In this embodiment, signals at higher frequencies are amplified more than signals at lower frequencies to compensate for the anticipated greater loss at the higher frequencies. As shown in FIG. 14a, the signal to be transmitted is amplified with an amplifier that provides greater amplification at higher frequencies of the 4.5 to 21 MHz band. Such amplifiers are well-known to those skilled in the art. The amplifier may have a transfer function substantially inverse to the frequency response of the LV transmission channel. Once amplified and filtered, the signal is conducted through switch 426 to the LV power line coupler 440 for transmission on the energized LV conductors of the LV power line. Of course, in alternate embodiments the transmission may not be predistorted and may be filtered and amplified substantially the same across the transmission channel.

FIG. 14b illustrates the transmit circuit used to drive the data signal (indicated by Vs). Components to the left of the dashed line in FIG. 14b may be inside the PLB 400 enclosure and those to the right may be outside the PLB 400 enclosure. The transmit circuit of this embodiment includes a transformer that drives the two conductor pairs 436 and 437. Each conductor pair 436, 437 is coupled to ground by impedance Z3, which may be resistive. In addition, each conductor 436a,b and 437a,b includes a series impedance Z1, which may be capacitive (e.g., providing a high pass filter) and/or resistive.

As discussed, the first and second PLB 400 cables 436, 437 are each comprised of a twisted pair of conductors 436a,b and 437a,b. As will be evident to those skilled in the art, each twisted pair cable 436, 437 will have an impedance (determined by the geometry of the cable) as represented by Z2 in FIG. 14b. This impedance Z2 may be modeled by a resistive component and an inductive component. The inductive component also may cause coupling between the two twisted conductors of each cable.

LV Power Line Coupler

In addition to the above, the LV power line coupler 410 may include the impedance matching circuitry and transient protection circuitry. The coupler 410 couples the data signal onto the LV power line as described above for reception by a user device communicatively coupled to the LV power line via a power line modem.

After the LV energized conductors enter the customer premises, typically only one LV energized conductor will be present at each wall socket where a power line modem might be installed (e.g., plugged in). Given this fact regarding the internal customer premises wiring, there is no way to know to which LV energized conductor the power line modem (and user device) will be connected. In addition, the subscriber may move the power line modem and user device to another socket to access the PLCS and the new socket may be coupled to the second (different) LV energized conductor. Given these facts, the network designer must supply communications on both LV energized conductors and, therefore, would be motivated to simultaneously transmit the PLC RF data signal on each LV energized conductor referenced to the neutral conductor. However, in comparison to transmitting the RF data signals on both energized conductors referenced to the neutral, the following method of providing communications on the LV energized has been found to provide improved performance.

As shown in FIG. 14b, the first PLB 400 cable 436 is coupled to the LV power line so that the data signal is applied to the first LV energized conductor referenced to the LV neutral conductor. The second PLB 400 cable 437 is coupled to the LV power line so that the data signal (Vs) is applied to the neutral conductor referenced to the second LV energized conductor. As a result, the data signal is applied to the first and second LV energized conductors differentially. In other words, with reference to the neutral conductor, the voltage signal (representing the data) on the second LV energized conductor is equal in magnitude and opposite in polarity of the voltage on the first LV energized conductor. Similarly, the current flow representing the data on the second LV energized conductor will be the opposite of the current flow on the first LV energized conductor in magnitude and direction. It has been found that differentially driving the LV energized conductors as described provides significant performance improvements over methods, which may result from reduced reflections, improved signal propagation, and impedance matching among other things. It is worth noting the transmit circuit of this and the following embodiments may transmit data signals with multiple carriers (e.g., eighty or more) such as with using an Orthogonal Frequency Division Multiplex (OFDM) modulation scheme.

Figure 14C:
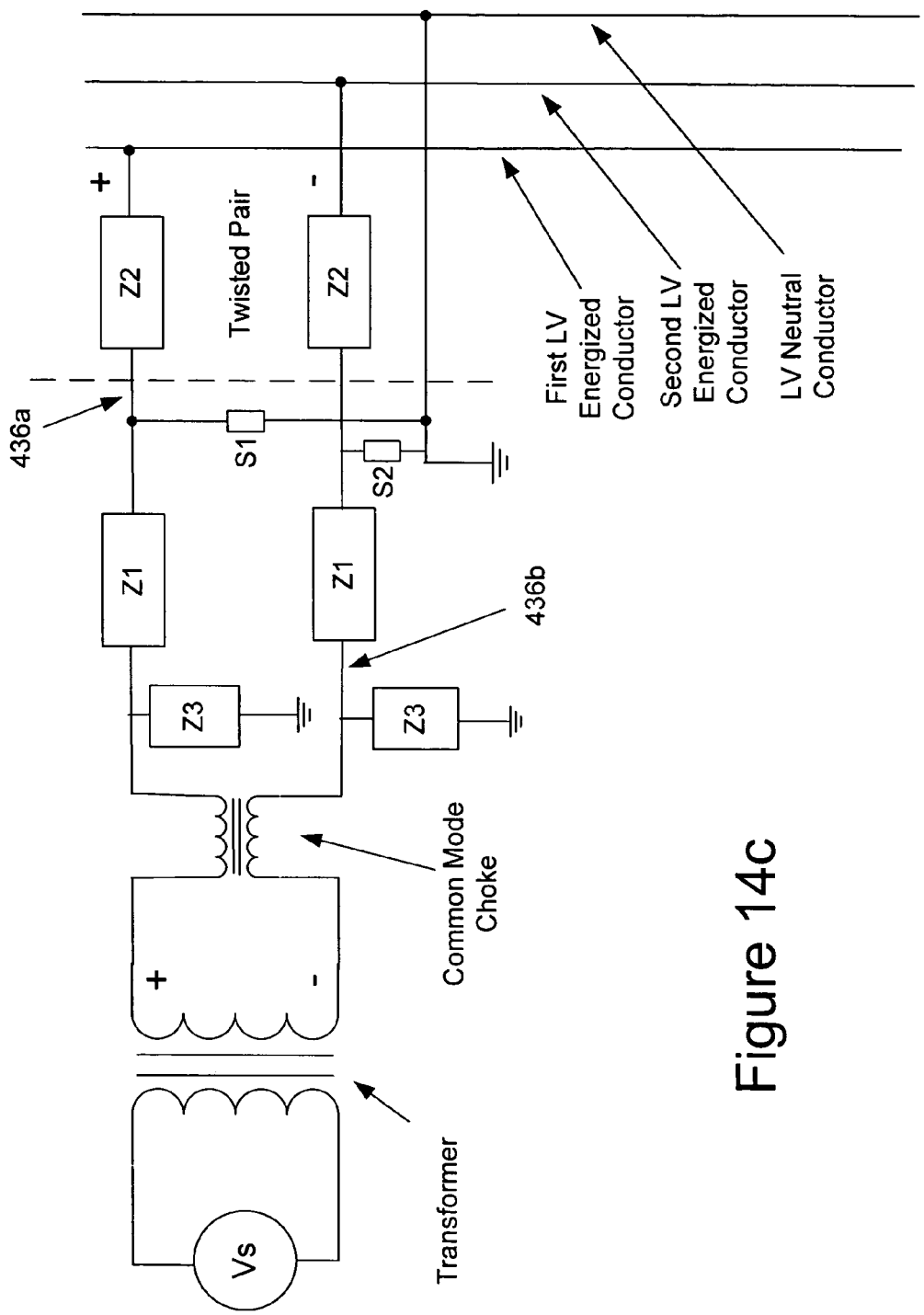

FIG. 14c illustrates another embodiment of a transmit circuit for transmitting the data signal. Components to the left of the dashed line in FIG. 14c may be inside the PLB 400 enclosure and those to the right may be outside the PLB 400 enclosure. The transmit circuit of this embodiment is comprised of a transformer that drives one conductor pair 436, which traverse through a common mode choke. The common mode choke provides a very low impedance to differential currents in the two conductors 436a,b, but provides a significant or high impedance to common mode currents (i.e., currents traveling in the same direction such as in or out). The two conductors 436a,b may also be coupled to ground by an impedance Z3, which may be a resistive impedance. In addition, each conductor 436a, b includes a series impedance Z1, which may be a capacitive impedance, or other high pass filter component(s), for impeding the 60 Hz power signal and permitting the RF data signal to pass unimpeded. Such impedances may be on either side of the common mode choke, but are preferably on the LV power line side of the choke.

In either embodiment, each conductor may also include a surge protection circuit, which in FIG. 14c are shown as S1 and S2. Finally, the cable 436 may be comprised of a twisted pair of conductors between the PLB 400 enclosure and LV power line. As will be evident to those skilled in the art, the twisted pair cable 436 may have an impedance (determined by the geometry of the cable) as represented by Z2. This impedance Z2 may be modeled by a resistive component and an inductive component. The inductive component also may cause coupling between the two twisted wired conductors.

While not shown in the figures, the transmit circuit of either embodiment may also include a fuse in series with each conductor and a voltage limiting device, such as a pair of oppositely disposed zener diodes, coupled between the pair of conductors and may be located between the common mode choke and the transformer. Finally, one of the conductors of the PLB 400 cable(s) 436 or 437 may used to supply power to the power supply of the PLB 400 to power the PLB.

It is worth noting that these embodiments of the present invention drive the first and second LV energized conductors differentially to transmit the data signal (e.g., using OFDM). However, the power line modem transmits data signals from the customer premises to the PLB 400 by applying the data signal to one conductor (e.g., one energized conductor) referenced to the other conductor such as a ground and/or neutral.

While in this embodiment the two energized conductors are opposite in magnitude, other embodiments may phase shift the data signal on one conductor (relative to the data signal on the other conductor) by forty-five degrees, ninety degrees, one hundred twenty degrees, one hundred eighty degrees, or some other value, in addition to or instead of differentially driving the two conductors.

Controller

As discussed, the controller 470 includes the hardware and software for managing communications and control of the PLB. In this embodiment, the controller 470 may include an IDT 32334 RISC microprocessor [NEED NEW PROCESSOR] for running the embedded application software and also includes flash memory for storing the boot code, device data and configuration information (serial number, MAC addresses, subnet mask, and other information), the application software, routing table, and the statistical and measured data. This memory includes the program code stored therein for operating the processor to perform the routing functions described herein. Other processors may be used as well. In another embodiment, the controller may be formed by the central processing unit of the cable modem.

This embodiment of the controller also includes random access memory (RAM) for running the application software and temporary storage of data and data packets. This embodiment of the controller 470 also includes an Analog-to-Digital Converter (ADC) for taking various measurements, which may include measuring the temperature inside the PLB 400 (through a temperature sensor such as a varistor or thermistor), for taking power quality measurements, detecting power outages, measuring the outputs of feedback devices, and others. The embodiment also includes a "watchdog" timer for resetting the device should a hardware glitch or software problem prevent proper operation to continue.

This embodiment of the controller 470 also includes an Ethernet adapter, an optional on-board MAC and physical (PHY) layer Ethernet chipset that can be used for converting peripheral component interconnect (PCI) to Ethernet signals for communicating with the backhaul side of the PLB. Thus, an RJ45 connector may provide a port for a wireless transceiver (which may be a 802.11 compliant transceiver) for communicating wirelessly.

The PLB 400 also may have a debug port, such as a debug port that can be used to connect serially to a portable computer. The debug port preferably connects to any computer that provides terminal emulation to print debug information at different verbosity levels and can be used to control the PLB 400 in many respects such as sending commands to extract all statistical, fault, and trend data.

In addition to storing a real-time operating system, the memory of controller 470 of the PLB 400 also includes various program code sections such as a software upgrade handler, software upgrade processing software, the PLS command processing software (which receives commands from the PLS, and processes the commands, and may return a status back to the PLS), the ADC control software, the power quality monitoring software, the error detection and alarm processing software, the data filtering software, the traffic monitoring software, the network element provisioning software, and a dynamic host configuration protocol (DHCP) Server for auto-provisioning user devices (e.g., user computers) and associated power line modems.

The router in this embodiment is not physically located between the two modems, but instead all three devices—the router, LV modem 450, and MV modem 280—are communicatively coupled together via the bus. Consequently, in some instances (e.g., at the occurrence of a particular event) the router may be programmed to allow the LV modem 450 to pass data directly to the MV modem 280 and vice versa, without performing data filtering and/or the other functions performed by the router which are described above.

This embodiment of the PLB 400 may only receive or transmit data over the LV power line at any one instant. However, as will be evident to those skilled in the art, the PLB 400 may transmit or receive over the LV power line, while simultaneously transmitting or receiving data over the MV power line and, depending on the specific implementation, may be able to receive and transmit on the MV side simultaneously (because those communications may use different frequency bands). Upstream communications from each PLB 400 may be time division multiplexed, while downstream communications may be broadcast (e.g., point to multi-point).

Any suitable frequency scheme may be used for communications over the MV power line. For example, if only one downstream channel is used (for communications from the MVID 300 to the PLBs), the system may use a six megahertz (MHz) channel from 29.7 MHz to 35.7 MHz and employ 256 QAM. If additional channels are used, such channels also may be six megahertz and be located between 36.85 MHz to 42.85 MHz and another from 44 MHz to 50 MHz. The upstream power line channel may be larger or smaller than the downstream channels. For example, the upstream communications (from PLBs 400 to the MVID) may be from 71.965 MHz to 74.835 MHz.

PLS Command Processing Software

The PLS and PLB 400 (or repeater) may communicate with each other through two types of communications: 1) PLS Commands and PLB 400 responses, and 2) PLB 400 Alerts and Alarms. TCP packets are used to communicate commands and responses. The commands typically are initiated by the NEM portion of the PLS. Responses sent by the PLB 400 (or repeater) may be in the form of an acknowledgement (ACK) or negative acknowledgement (NACK), or a data response depending on the type of command received by the PLB 400 (or repeater).

Commands

The PLS may transmit any number of commands to the PLB 400 to support system control of PLB 400 functionality. As will be evident to those skilled in the art, most of these commands are equally applicable for repeaters. For ease of discussion, however, the description of the commands will be in the context of a PLB 400 only. These commands may include altering configuration information, synchronizing the time of the PLB 400 with that of the PLS, controlling measurement intervals (e.g., voltage measurements of the ADC), requesting measurement or data statistics, requesting the status of user device activations, and requesting reset or other system-level commands. Any or all of these commands may require a unique response from the PLB, which is transmitted by the PLB 400 (or repeater) and received and stored by the PLS.

Alerts

In addition to commands and responses, the PLB 400 (or repeater) has the ability to send Alerts and Alarms to the PLS (the NEM) via User Datagram Protocol (UDP), which does not require an established connection but also does not guarantee message delivery.

Alerts typically are either warnings or informational messages transmitted to the NEM in light of events detected or measured by the PLB. Alarms typically are error conditions detected by the PLB. Due to the fact that UDP messages may not be guaranteed to be delivered to the PLS, the PLB 400 may repeat Alarms and/or Alerts that are critically important to the operation of the device.

One example of an Alarm is an Out-of-Limit Alarm that indicates that an out-of-limit condition and has been detected at the PLB, which may indicate a power outage on the LV power line, a temperature measurement inside the PLB 400 is too high, and/or other out-of-limit condition. Information of the Out-of-Limit condition, such as the type of condition (e.g., a LV voltage measurement, a PLB 400 temperature), the Out-of-Limit threshold exceeded, the time of detection, the amount (e.g., over, under, etc.) the out of limit threshold has been exceeded, is stored in the memory of the PLB 400 and may be retrieved by the PLS.

Software Upgrade Handler

The Software Upgrade Handler software may be started by the PLS Command Processing software in response to a PLS command. Information needed to download the upgrade, including for example the remote file name and PLS IP address, may be included in the parameters passed to this software module (or task) from the Software Command Handler.

Upon startup, this task may open a file transfer program such as Trivial File Transfer Protocol (TFTP) to provide a connection to the PLS and request the file. The requested file is then downloaded to the PLB. For example, the PLS may transmit the upgrade through the Internet, through the backhaul point 10, through the MV power line to the PLB 400 where the upgrade may be stored in a local RAM buffer and validated (e.g., error checked) while the PLB 400 continues to operate (i.e., continues to communicate packets to and from power line modems and the backhaul point 10). Finally, the task copies the downloaded software into a backup boot page, and transmits an Alert indicating successful installation to the PLS. A separate command transmitted from the PLS, processed by the Command Processing software of the PLB, may make the newly downloaded and validated program code the primary software operating the PLB. If an error occurs, the PLB 400 issues an Alert indicating the download was not successful.

ADC Scheduler

The ADC Scheduler software, in conjunction with the real-time operating system, creates ADC scheduler tasks to perform ADC sampling according to configurable periods for each sample type. Each sample type corresponds with an ADC channel. The ADC Scheduler software creates a scheduling table in memory with entries for each sampling channel according to default configurations or commands received from the PLS. The table contains timer intervals for the next sample for each ADC channel, which are monitored by the ADC scheduler.

Based on the measured voltages, the PLS may also determine the location and/or area of a power outage. Periodically, the PLS may ping each (or some subset of) network element. The determination of a power outage may be made by a failure of a network element to respond to the periodic ping (or other command or request) transmitted by the PLS. If the network element has an alternate power source such as a battery backup, the network element may transmit a notification of the power outage (e.g., based on a low voltage measurement by the network element).

Based on the network element(s) serial number(s), the PLS can retrieve the network element's physical location (such as its pole number, which may be mapped to a longitude and latitude and/or street address) from memory to determine the location of the power outage. Thus, by determining that a number of network elements are not responsive, the PLS may map an area without power. Information of the power outage, such as the location(s) time, etc., may then be transmitted to the utility company.

ADC Measurement Software

The ADC Measurement Software, in conjunction with the real-time operating system, creates ADC measurement tasks that are responsible for monitoring and measuring data accessible through the ADC 330. Each separate measurable parameter may have an ADC measurement task. Each ADC measurement task may have configurable rates for processing, recording, and reporting for example.

An ADC measurement task may wait on a timer (set by the ADC scheduler). When the timer expires the task may retrieve all new ADC samples for that measurement type from the sample buffer, which may be one or more samples. The raw samples are converted into a measurement value. The measurement is given the timestamp of the last ADC sample used to make the measurement. The measurement may require further processing. If the measurement (or processed measurement) exceeds limit values, an alarm condition may be generated. Out of limit Alarms may be transmitted to the PLS and repeated at the report rate until the measurement is back within limits. An out of limit recovery Alert may be generated (and transmitted to the PLS) when the out of limit condition is cleared (i.e., the measured value falls back within limit conditions).

The measurements performed by the ADC 330, each of which has a corresponding ADC measurement task, may include PLB 400 inside temperature, LV power line voltage, LV power line current (e.g., the voltage across a resistor), AGC1 (corresponding to Feedback device 423*a*), and AGC2 (corresponding to Feedback device 423*a*) for example.

As discussed, the PLB 400 includes value limits for most of these measurements stored in memory with which the measured value may be compared. If a measurement is below a lower limit or above an upper limit (or otherwise out of an acceptable range), the PLB 400 may transmit an Out-of-Limit Alarm, which is received and stored by the PLS. In some instances, one or more measured values are processed to convert the measured value(s) to a standard or more conventional data value.

The measured data (or measured and processed data) is stored in the memory of the PLB. This memory area contains a circular buffer for each ADC measurement and time stamp. The buffers may be read by the PLS Command Processing software task in response to a request for a measurement report. The measurement data may be backed up to flash memory by the flash store task.

The LV power line voltage measurement may be used to provide various information. For example, the measurement may be used to determine a power outage, or measure the power used by a consumer or by all of the consumers connected to that distribution transformer. In addition, it may be used to determine the power quality of the LV power line by measuring and processing the measured values over time to provide frequency, harmonic content, and other power line quality characteristics.

Traffic Monitoring Software

The Traffic Monitoring software may collect various data packet traffic statistics, which may be stored in memory including the amount of data (i.e., packets and/or bytes) communicated (i.e., transmitted and received) through the MV power line, and/or through the LV power line; the amount of data (packets and/or bytes) communicated (transmitted and received) to and/or from the PLS; the number of Alerts and Alarms sent to the PLS; the number of DHCP requests from user devices; the number of failed user device authentications; the number of failed PLS authentications; and the number of packets and bytes received and/or transmitted from/to each user device (or power line modem 50).

Data Filtering Software

The Data Filtering software provides filtering of data packets transmitted to and/or from a user device (or power line modem). The filtering criteria may be supplied from the PLS (which may be based on requests received from the user) and is stored in memory of the PLB 400 and may form part of the routing table. The Data Filtering software may analyze the data packets and may prevent the transmission of data packets through the PLB:1) that are transmitted to the user device from a particular source (e.g., from a particular person, user, domain name, email address, or IP or MAC source address); 2) that are transmitted from the user device to a particular destination (e.g., to a particular person, email address, user, domain name, or IP or MAC destination address); 3) that have particular content (e.g., voice data or video data); 4) based on the time of transmission or reception (e.g., times of the day and/or days of the week); 5) that surpass a threshold quantity of data (either transmitted, received, or combination thereof) for a predetermined window of time (e.g., a day, week, month, year, or subscription period); or 7) some combination thereof.

Auto-Provision and Activation of Network Components

"Auto-Provisioning" is the term used that may be used to refer to the steps performed to get a new network element (e.g., a PLB, repeater, or backhaul point 10) onto the PLCS network. While skilled in working with power lines, personnel installing the PLBs 400 (linemen) often have little or no experience in working with communication networks. Consequently, it is desirable to have a system that permits easy installation of the PLBs 400 without the need to perform network configuration or other network installation procedures.

In the present example embodiment, each network element includes a unique identifier, which may be a serial number. In this embodiment, the enclosure of the PLB 400 has a barcode that the installer scans to record the serial number. The installer also records the location of the installed device. This information (the identifying information and location) is provided to a network administrator to input the information into the PLS. Alternately, the installer may wirelessly transmit the information to the PLS for reception and storage by the PLS.

In one example embodiment, after being physically installed and powered up, the PLB 400 transmits a request, such as a dynamic host configuration protocol (DHCP) request, to the BP 10 with whom the communication device is physically or functionally connected. In response to the request, the BP 10 assigns and transmits an IP address to the MV interface 200 (i.e., assigns an IP address to be used to communicate with the MV modem 280), and the MV subnet mask. In addition, the BP transmits the IP address of the BP 10 to be used as the PLB's network gateway address, and the IP address for the PLS. The PLB 400 receives the information from the BP 10 and stores it in its non-volatile memory.

The PLB 400 then transmits an Alive Alert to the PLS (using the IP address received in response to the DHCP request) indicating that the PLB 400 is running and connected to the network. The Alive Alert may include information identifying the PLB, network configurations of the PLB 400 (e.g., MAC addresses of the LV modem 450 and MV modem 280), the IP address of the MV Interface (i.e., the IP address assigned to the MV modem 280 received from the BP 10) and MV subnet mask for use by the communication device's backhaul interface (much of which was received from the BP 10). This information is stored by the PLS in the network elements database.

In response, the PLS may activate the PLB 400 by assigning and transmitting the PLB 400 a LV subnet mask and a LV Interface IP address (i.e., the IP address used to communicate with the LV modem 450). If there are customers present on the LV subnet, the PLS will transmit customer information to the PLB, which may include such information as data filtering information, keys (e.g., encryption keys), user device IP addresses, and subscription levels for the various users and/or user devices. In addition, the PLS may configure the PLB 400 by transmitting DNS addresses (e.g., a first and second DNS address), and a registration server IP address. This information is stored by the PLS (in the network elements database) and the PLB. As discussed below, until a user device is registered, the PLB 400 may be programmed to allow the user device to access only the domain name servers and registration server.

Provisioning a New User Device

Similarly, when a user installs a new user device on the LV subnet attached to the PLB, the user device may need to be provisioned to identify itself on the network. To do so in this embodiment, the new user device transmits a DHCP request, which is received and routed by the PLB 400 to a DHCP server running in the controller 470 of the PLB. In response to the request, the PLB 400 may respond by transmitting to the user device the IP address and subnet mask for the user device, the gateway IP address for the device's network interface to be used as the network gateway (e.g., the IP address of the LV modem 450 of the PLB), and the IP addresses of the Domain Name Servers (DNS) all of which are stored in memory by the user device. In addition, the PLB 400 may transmit a new user device Alert to the PLS.

After provisioning, it may be necessary to register the user device with the network, which may require providing user information (e.g., name, address, phone number, etc.), payment information (e.g., credit card information or power utility account information), and/or other information to the registration server. The registration server may correlate this information with information of the utility company or Internet service provider. The registration server may form part of, or be separate from, the PLS. Until registered, the PLB 400 prevents the user device (through its power line modem 50) from communicating with (receiving data from or transmitting data to) any computer other than the registration server or the two DNSs. Thus, until the user device is registered, the PLB 400 may filter data packets transmitted to and/or from the user device that are not from or to the registration server or a DNS. In addition, requests (such as HTTP requests) for other Internet web pages may be redirected and transmitted as a request for the registration web page on the registration server, which responds by transmitting the registration web page. Control of access of the user device may be performed by limiting access based on the IP address of the user device to the IP addresses of the registration server and DNSs.

After registration is successfully completed, the registration server communicates with the PLS to provide registration information of the user device to the PLS. The PLS transmits an activation message for the user device (or power line modem) to the PLB. In response, the PLB 400 removes communication restrictions and permits the user device (and power line modem 50) to communicate through the PLCS to all parts of the Internet. As will be evident to those skilled in the art, filtering of data and controlling access of the user device may be performed by limiting access based on the IP address of the user device (or depending on the network communication protocol, the MAC address of the user device) or the MAC address of the power line modem 50 to which the user device is connected. Thus, the PLB 400 may compare the source IP address (or MAC address) with information in its memory to determine if the IP address (or MAC address) is an address that has been granted access to the PLCS. If the source address is not an address that has been granted access to the PLCS (e.g., by registering, which results in an activation message from the PLS to the PLB), the PLB 400 may replace the destination IP address of the packet with the IP address of the registration server and transmit the packet to the backhaul point. The procedure above, or portions of the procedure, with respect to provisioning user devices may be used to provision a power line modem instead of or in addition to a user device.

Alternate Embodiments

As discussed, the PLB 400 of the above embodiment communicates data signals to user devices via the LV power line. Rather than communicating data signals to the power line modem and/or user devices via the LV power line, the PLB 400 may use other communication mediums. For example, the PLB 400 may convert the data signals to a format for communication via a telephone line, fiber optic, cable, or coaxial cable line. Such communication may be implemented in a similar fashion to the communication with LV power line as would be well known to those skilled in the art.

In addition, the PLB 400 may convert the data signal to radio signals for communication over a wireless communication link to the user device. In this case, user device may be coupled to a radio transceiver for communicating through the wireless communication link. The wireless communication link may be a wireless local area network implementing a network protocol in accordance with an IEEE 802.11 (e.g., a, b, or g) standard.

Alternatively, the PLB 400 may communicate with the user device via a fiber optic link. In this alternative embodiment, the PLB 400 may convert the data signals to light signals for communication over the fiber optic link. In this embodiment, the customer premises may have a fiber optic cable for carrying data signals, rather than using the internal wiring of customer premise.

In addition to or instead of a wired connection or fiber connection, the MVID 300 may include a transceiver such as a wireless transceiver for communicating with the AP 100 or DP 200 wirelessly (e.g., an 802.11 wireless link) and/or the PLBs. Likewise, the CMTS may alternately communicate with the DP 200 via a wireless connection.

Thus, the AP 100 may communicate with the DP 200 or MVID 300 via a Wireless Modem Termination System (WMTS) and a hub transceiver antenna at the base station, and a transceiver antenna at the DP 200 or MVID. Preferably, the system uses DOCSIS-compatible protocols and offers scalability and measurable Quality of Service (QoS). Such a system commercially available from Arcwave located at 910 Campisi Way #1C, Campbell, Calif. 95008 in there ARCXtend™ Wireless Plant Extension Solution, which includes their ARCell products. The wireless link may be in the license-free 5 GHz bands or in a different and licensed band.

In another embodiment, the wireless link is provided via the ARCXtend Wireless Plant Extension solution by Arcwave. In another embodiment, the DL-5800 by Wireless Bypass, Inc., which also wirelessly communicates with DOCSIS protocols may be use for bi-directional communications.

In addition, the controller 470 of this embodiment may include substantially the same software and functionality as that described with respect to the PLB 400 and modifications thereto would be readily apparent to one skilled in the art.

Miscellaneous

As discussed, the functions of the power line modem may be integrated into a smart utility meter such as a gas meter, electric meter, or water meter. The meter may be assigned an IP address by the PLCS (e.g., by the PLS) and, upon receiving a request or at predetermined intervals, transmit data such as consumption data to the PLB, the PLS, and/or a utility computer system in a manner described herein, thereby eliminating the need to have utility personnel physically travel to read the meter. In addition, one or more addressable switches, which may form part of a utility meter, may be controlled via the PLCS (e.g., with commands transmitted from the PLB, the PLS, and/or utility computer system) to permit connection and disconnection of gas, electricity, and/or water to the customer premises.

Similarly, the PLCS may be used to control MV power line switches. The addressable MV power line switch may be a motorized switch and assigned an IP address by the PLS, which is also provided to the utility computer system to thereby operate the switch. When a power outage is detected, the utility company may remotely operate one or more addressable MV power line switches to provide power to the area where the outage is detected by transmitting commands to the IP addresses of the switches.

Likewise, the PLCS may be used to operate a capacitor switch that inserts or removes a capacitor (or capacitor bank) into the power distribution system. Capacitor banks are used to improve the efficiency of the power distribution network by providing Volt/VAr management (e.g., modifying the reactance of the power distribution network). Thus, the PLS may assign an IP address to one or more capacitor switches, which is also provided to the utility computer system to thereby operate the switch. Based on power quality measurements taken and received from one or more PLBs, the utility company may insert or remove one or more capacitor banks by remotely actuating one or more capacitor bank switches by transmitting commands to the IP addresses of the switches.

The capacitor switch and the MV power line switch may be controlled by an embodiment of the present invention that includes a MV interface and controller. In addition, in some embodiments a LV interface may also be employed.

The power line modem in the above embodiments has been described as a device that is separate from the user device. However, the power line modem may also be integrated into and form part of the user device.

While the above described embodiments utilize a single modem in the LV interface and the in the MV interface, alternate embodiments may use two modems in the LV interface and/or two modems in the MV interface. For example, the LV interface may comprise a receive path (for receiving data from the LV power lines) that includes a LV modem and signal conditioning circuitry and a transmit path (for transmitting data through the LV power lines) that includes a second LV modem and signal conditioning circuitry. Each LV modem may have a separate address (MAC and IP address) and operate at a separate frequency band. Thus, the receive or transmit LV interfaces may also include frequency translation circuitry.

Likewise, as another example the MV interface may comprise a receive path (for receiving data from the MV power line) that includes a MV modem and signal conditioning circuitry and a transmit path (for transmitting data through the MV power line) that includes a second MV modem and associated signal conditioning circuitry. Each MV modem may have a separate address (MAC and IP address) and operate at a separate frequency band. Thus, the receive or transmit MV interfaces may also include frequency translation circuitry. A repeater may also be constructed with multiple MV modems in both of its MV interfaces or in its only MV interface as the case may be.

While the described embodiments may apply the data signals to one MV conductor (and the data signals may couple to other conductors), other embodiments may apply the data signals differently. For example, a first MV coupler (and an associated MV interface) may be coupled to a first MV conductor for transmitting data on the MV conductor and a second MV coupler may be coupled to a second MV conductor for receiving the return current of the transmitted data. The two couplers may thus share a signal MV modem. Similarly, the first and second couplers (coupled to the first and second MV power line conductors) may transmit (and receive) the data signals differentially as described above in the context of the LV power line transmissions and shown in FIGS. 6b and 6c. Thus, the same data signal may be transmitted down multiple MV conductors with the signal on each conductor being phase shifted (e.g., 120 degrees or 180 degrees) with respect to the signal(s) on the other conductor(s). Alternately, in any of these embodiments, the neutral conductor may be used (e.g., as a return path or separate transmission path) instead of one or more of the MV conductors.

The PLBs 400 may communicate with the user devices via low voltage repeater.

As will be evident to those skilled in the art, the MVIDs 300 and power line modem for communicating with these alternate embodiments of the bypass device (or repeater) would also require similar circuitry for transmitting and receiving with multiple modems and in the different frequency bands. More specifically, the modified power line modem would also require a first and second modem for transmitting and receiving, respectively, and designed to operate in the appropriate frequency bands for establishing communications. Such a system would permit full duplex communications through the power lines.

In the above embodiment, the processor performs routing functions and may act as a router in some instances and perform other functions at other times depending on the software that is presently being executed. The router may also be a chip, chip set, or circuit board (e.g., such as an off the shelf circuit card) specifically designed for routing, any of which may include memory for storing, for example, routing information (e.g., the routing table) including MAC addresses, IP addresses, and address rules.

While the above description describes communications between the MVIDs 300 and DPs to be via optical, wireless, T1, or coaxial cable communication medium, the communications may also be accomplished by using over a MV power line or neutral conductor using conductive electrical signals or surface waves.

Finally, the type of data signal coupled by the coupling device may be any suitable type of data signal. The type of signal modulation used can be any suitable signal modulation used in communications (Code Division Multiple Access (CDMA), Time Division Multiple Access (TDMA), Frequency Division Multiplex (FDM), Orthogonal Frequency Division Multiplex (OFDM), and the like). OFDM may be used on one or both of the LV and MV power lines. In addition, DOCSIS signals may be used on the MV power lines and over the fiber optic conductors in the above described embodiments. A modulation scheme producing a wideband signal such as OFDM or CDMA that is relatively flat in the spectral domain may be used to reduce radiated interference to other systems while still delivering high data communication rates.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A system for providing communications to user devices via an underground power line comprising a plurality of segments disposed in series with each other and carrying a power signal having a voltage greater than one thousand volts, comprising:
- an interface device communicatively coupled to the underground power line and having an interface configured to be communicative via a non-power line communications medium;
- a first and second power line communications device, each said power line communications device including a first port communicatively coupled to the underground power line for communications with said interface device and a second port in communication with one or more user devices;
- wherein said first power line communications device is communicatively coupled to the power line between the interface device and said second power line communications device;
- wherein said interface device is configured to transmit communications signals to said first and second power line communications devices in a first set of frequencies and said first and second communications devices are configured to receive communications in the first set of frequencies;
- wherein said first and second power line communications devices are configured to transmit communications signals toward said interface device in a second set of frequencies and said interface device is configured to receive communications in the second set of frequencies;
- wherein said first power line communications device further comprises
- a first amplifier circuit configured to amplify first signals received via the power line from said second power line communications device in the second set of frequencies; and
- a first coupler configured to couple the amplified first signals onto the power line and
- wherein said first power line communications device is configured to receive the first signals, amplify the first signals, and couple the amplified first signals onto the power line without demodulating the first signals.

2. The system of claim 1, wherein said first power line communications device is configured to receive data signals received from the one or more user devices and to transmit at least some of the received data signals to said interface device.

3. The system of claim 1, wherein said first power line communications device includes a second amplifier circuit configured to amplify second signals received from said interface device in the first set of frequencies.

4. The system of claim 3, wherein said first power line communications device further comprises a second coupler configured to couple the second amplified signals to the power line.

5. The system of claim 1, wherein said first power line communications device further includes a modem configured to communicate over the power line via a protocol substantially compatible with a Data Over Cable System Interface Specification (DOCSIS).

6. The system of claim 1, wherein said first and second said power line communications devices each includes a router.

7. The system of claim 1, wherein said first and second power line communications device each includes a cable modem substantially compliant with a DOCSIS specification.

8. The system of claim 1, wherein the first and second power line communications devices are configured to transmit to said interface device using time division multiplexing.

9. The system of claim 1, wherein the first and second power line communications devices are configured to transmit to said interface device using CDMA.

10. The system of claim 1, wherein said interface device is communicatively coupled to the Internet via a cable modem termination system (CMTS).

11. The system of claim 1, wherein said second port of said first power line communications device is communicatively coupled to a low voltage power line to provide communications therethrough to the one or more user devices.

12. The system of claim 11, wherein said first line power line communications device is configured to communicate with the user devices via a third set of frequencies.

13. The system of claim 1, wherein said first power line communications device is disposed in a transformer enclosure.

14. The system of claim 1, wherein said first and second power line communications devices are configured to receive and process a plurality of DOCSIS commands.

15. The system of claim 1, wherein the non-power line communications medium comprises a fiber optic conductor.

16. The system of claim 1, wherein the non-power line communications medium comprises a wireless link.

17. The system of claim 1, wherein said interface device is communicatively coupled to the power line at a riser pole.

18. The system of claim 1, wherein said first coupler comprises a first and second port that do not include a high pass filter and a third port that includes a high pass filter and that is communicatively coupled to said first and second port.

19. A system for providing communications via one or more power lines comprising a plurality of segments disposed in series with each other and carrying a power signal having a voltage greater than one thousand volts, comprising:
- an aggregation device;
- a plurality of distribution devices communicatively coupled to said aggregation device via a non-power line communications medium;
- a plurality of interface devices, each said interface device communicatively coupled to one of the power lines and each said power line interface device communicatively coupled to one of said plurality of said distribution devices via a non-power line communications medium;
- a plurality of power line communications devices, each said power line communications device comprising a first port and second port;
- said first port of each power line communications device being coupled to one segment of the one or more power lines and said second port of each being coupled to a different segment of the one or more power lines, each said power line communications device including a third port communicatively coupled to a low voltage power line, each said power line communications device including a first modem in communications with said first port, a second modem in communications with said first modem and said third port, and a router in communication with said second modem;
- wherein at least one of said plurality of power line communications devices includes a first amplifier having an input and an output and configured to amplify data signals in a first frequency band, said output of said first amplifier being communicatively coupled to said first port and said input of said first amplifier being communicatively coupled to said second port; and wherein said at least one of said plurality of power line communications device is configured to receive first data signals from the different segment of the one or more power lines, amplify the first data signals, and couple the amplified first data signals to the one segment of the one or more power lines without demodulating the first data signals.

20. The system of claim 19, wherein at least one of said plurality of distribution points is communicatively coupled to said aggregation device via one or more fiber optic conductors.

21. The system of claim 19, wherein said aggregation device includes a cable modem termination system.

22. The system of claim 19, wherein said interface device includes an interface configured to communicate via one or more fiber optic conductors and an electrical-to-optic converter communicatively coupled to said interface.

23. The system of claim 19, wherein said at least one of said plurality of power line communications devices includes:

a second amplifier configured to amplify data signals in a second frequency band; said output of said second amplifier being communicatively coupled to said second port and said input of said second amplifier being communicatively coupled to said first port.

24. The system of claim 19, wherein said first modem of said plurality of power line communications devices includes a cable modem.

25. The system of claim 19, wherein said first modem is configured to receive and process a plurality commands substantially compliant with a DOCSIS specification.

26. The system of claim 19, wherein the non-power line communications medium communicatively coupling at least one of the plurality of interface devices to one of said plurality of distribution devices comprises a fiber optic conductor.

27. The system of claim 26, wherein a first of said plurality of interface devices is communicatively coupled to one of said plurality of distribution devices via a second of said plurality of said interface devices.

28. The system of claim 27, wherein said second of said plurality of interface devices is configured to combine data from said first of said plurality of interface devices with data from said second of said plurality of interface devices for communication to said one of said plurality of distribution devices via a fiber optic conductor.

29. The system of claim 19, wherein the non-power line communications medium communicatively coupling at least one of the plurality of interface devices to one of said plurality of distribution devices a wireless link.

30. A method of providing communications to user devices via an underground power line comprising a plurality of segments disposed in series with each other and carrying a power signal having a voltage greater than one thousand volts, comprising:

at an interface device:
receiving first data via a non-power line communications medium; and
transmitting said first data in a first frequency band via the power line;
at a first power line communications device:
receiving the first data in a first data signal via the power line from the interface device;
amplifying the first data signal;
coupling the amplified first data signal in the first frequency band to the power line;
wherein the first data signal is received from the power line, amplified, and coupled to the power line without demodulating the first data signal; and
at a second power line communications device:
receiving the amplified first data signal; and
demodulating the data signal to provide the first data.

31. The method of claim 30, further comprising demodulating the first data signal at the first power line communications device.

32. The method of claim 30, further comprising:
at the second power line communications device:
modulating the first data to provide a second data signal; and
transmitting the second data signal to a user device via a low voltage power line.

33. The method of claim 32, further comprising routing the first data prior to modulating the first data at the second power line communications device.

34. The method of claim 30, further comprising routing the first data at the second power line communications device.

35. The method of claim 30, further comprising:
at the second power line communications device:
receiving second data transmitted from a user device; and
transmitting the second data in a second frequency band via the power line;
at a first power line communications device:
receiving the second data in a second data signal from the second power line communications device;
amplifying the second data signal; and
coupling the amplified second data signal in the second frequency band to the power line;
wherein the second data signal is received, amplified, and coupled to the power line without demodulating the second data signal; and
at the interface device:
receiving the amplified second data signal; and
communicating the second data via a non-power line communications medium.

36. The method of claim 35, wherein said second data is received via a low voltage power line data signal at the second power line communication device, the method further comprising:
demodulating the low voltage power line data signal to provide the second data.

37. The method of claim 36, further comprising routing the second data at the second power line communications device.

38. The method of claim 35, further comprising:
at the first power line communications device:
receiving third data from a user device; and
transmitting the third data in the second frequency band via the power line; and
at the interface device:
receiving the third data; and
communicating the third data via a non-power line communications medium.

39. The method of claim 30, wherein the first data is in a data signal amplified by a third power line communications device coupled to the power line between the first power line communications device and the interface device.

40. The method of claim 30, wherein the non-power line communications medium includes a fiber optic conductor.

41. The method of claim 30, wherein the non-power line communications medium includes a wireless link.

42. The method of claim 30, wherein the first frequency band includes at least some frequencies between thirty megahertz and fifty megahertz.

43. The method of claim 30, further comprising frequency shifting the signals carrying the first data at the interface device.

44. The method of claim 30, wherein the first data includes one of a DOCSIS command and a DOCSIS status request.

45. The method of claim 30, wherein the interface device is communicatively coupled to the Internet via a CMTS.

46. A method of providing communications to user devices via an underground power line comprising a plurality of segments disposed in series with each other and carrying a power signal having a voltage greater than one thousand volts, comprising:
   at a first power line communications device:
      receiving first data; and
      transmitting the first data via the power line;
   at a second power line communications device:
      receiving the first data in a first data signal via the power line from the first power line communications device;
      amplifying the first data signal; and
      coupling the amplified first data signal to the power line;
   wherein the first data signal is received, amplified, and coupled to the power line by the second power line communications device without demodulating the first data signal; and
   at an interface device:
      receiving the amplified first data signal; and
      transmitting the first data via a non-power line communications medium; and
   wherein transmissions from the second power line communications device and the interface device employ different carrier frequencies.

47. The method of claim 46, further comprising:
   at the second power line communications device:
   receiving second data from a user device; and
   transmitting the second data via the power line.

48. The method of claim 47, wherein transmissions toward the interface device from the first and second power line communications devices are via time division multiplexing.

49. The method of claim 47, further comprising routing the second data at the first power line communications device.

50. The method of claim 46, wherein the non-power line communications medium includes a fiber optic conductor.

51. The method of claim 46, wherein the non-power line communications medium includes a wireless link.

52. The method of claim 46, further comprising frequency shifting the signal carrying the first data at the interface device.

53. The method of claim 46, wherein the first power line communication device is configured to process data that includes at least one of a DOCSIS command and a DOCSIS status request.

54. The method of claim 46, wherein the interface device is communicatively coupled to the Internet via a CMTS.

55. A system for providing communications to user devices via a power distribution network comprising an underground power line carrying a power signal having a voltage greater than one thousand volts, and a plurality of low voltage power lines with each low voltage power line receiving power from the underground power line via a distribution transformer, the system comprising:
   an interface device communicatively coupled to the underground power line and having an interface configured to communicate via a non-power line communications medium;
   a first and second power line communications device, each said power line communications device including a first modem coupled to the underground power line and a second modem communicatively coupled to one of the low voltage power lines;
   wherein said first power line communications device is communicatively coupled to the underground power line between the interface device and said second power line communications device; and
   wherein said first power line communications device includes an amplifier configured to amplify received signals transmitted by said interface device via the power line and a first coupler configured to couple the amplified signals to the power line for reception by said second power line communications device; and
   wherein said first power line communications device is configured to receive the signals, amplify the signals, and couple the amplified signals to the power line without demodulating the signals.

56. The system of claim 55, wherein:
   said second modem of said first power line communications device is configured to receive data signals received from user devices; and
   said first modem is configured to transmit at least some of the received signals to said interface device via the underground power line.

57. The system of claim 56, wherein said first power line communications device includes a second amplifier circuit configured to amplify received signals transmitted from said second power line communications device; and
   a second coupler configured to couple the signals received from said second power line communications device and amplified by said second amplifier circuit to the underground power line for reception by said interface device.

58. The system of claim 57, wherein said second coupler communicatively couples said first modem of said first power line communications device to the underground power line.

59. The system of claim 58, wherein coupling of signals to the underground power line by said second coupler from said first modem of said first power line communications device is via time division multiplexing.

60. The system of claim 55, wherein:
   said interface device is configured to transmit communications signals to said first and second power line communications devices in a first set of frequencies and said first and second power line communications devices are configured to receive communications in the first set of frequencies; and
   said first and second communications devices are configured to transmit communications signals toward said interface device in a second set of frequencies and said interface device is configured to receive communications in the second set of frequencies.

61. The system of claim 60, wherein said second modem of said first and second line power line communications devices is configured to communicate with user devices via a third set of frequencies.

62. The system of claim 55, wherein said first and second said power line communications devices each includes a router communicatively coupled to said first and second modems.

63. The system of claim 55, wherein said first modem of said first and second power line communications devices communicates via a protocol that is substantially compliant with a DOCSIS specification.

64. The system of claim 55, wherein the first and second power line communications device are configured to transmit to said interface device using time division multiplexing.

65. The system of claim 55, wherein said first and second power line communications devices are configured to transmit to said interface device using code division multiplexing.

66. The system of claim 55, wherein said interface device is communicatively coupled to the Internet via a cable modem termination system.

67. The system of claim 55, wherein said first power line communications device is disposed in a transformer enclosure.

68. The system of claim 55, wherein said wherein said first and second power line communications devices are configured to receive and process a plurality of DOCSIS commands.

69. The system of claim 55, wherein the non-power line communications medium comprises a fiber optic conductor.

70. The system of claim 55, wherein the non-power line communications medium comprises a wireless link.

71. The system of claim 55, wherein said interface device is communicatively coupled to the underground power line at a riser pole.

72. The system of claim 55, wherein said first coupler comprises a first and second port that do not include a high pass filter and a third port that includes a high pass filter and that is communicatively coupled to said first and second port.

* * * * *

UNITED STATES PATENT AND TRADEMARK OFFICE
CERTIFICATE OF CORRECTION

PATENT NO.       : 7,321,291 B2
APPLICATION NO.  : 10/973493
DATED            : January 22, 2008
INVENTOR(S)      : Gidge It is certified that error appears in the above-identified patent and that said Letters Patent is hereby corrected as shown below:

Title page 2, in field (56), under "U.S. Patent Documents", in column 1, line 52, below "6,922,135 B2  7/2005 Abraham"
insert -- 6,933,317  01/31/2006 Belsak, Jr., Frederick --.

Title page 2, in field (56), under "U.S. Patent Documents", in column 2, line 52, after "2006/0146866 A1"
delete "7/2006" and insert -- 6/2006 --, therefor.

In column 1, line 39, delete "customers" and insert -- customer's --, therefor.

In column 6, line 32, delete "decrypted," and insert -- decrypted --, therefor.

In column 14, line 49, delete "protocol." and insert -- protocol, --, therefor.

In column 48, line 4, in Claim 68, after "wherein said" delete "wherein said".

Signed and Sealed this

Seventeenth Day of June, 2008

JON W. DUDAS
*Director of the United States Patent and Trademark Office*